(12) United States Patent
Rojas

(10) Patent No.: US 10,121,208 B2
(45) Date of Patent: Nov. 6, 2018

(54) THEMATIC REPOSITORIES FOR TRANSACTION MANAGEMENT

(71) Applicant: PAYBOOK, INC., Austin, TX (US)

(72) Inventor: Gerardo Trevino Rojas, Austin, TX (US)

(73) Assignee: Paybook, Inc., Austin, TX (US)

( * ) Notice: Subject to any disclaimer, the term of this patent is extended or adjusted under 35 U.S.C. 154(b) by 0 days.

(21) Appl. No.: 14/774,047

(22) PCT Filed: Mar. 9, 2014

(86) PCT No.: PCT/US2014/022215
§ 371 (c)(1),
(2) Date: Sep. 9, 2015

(87) PCT Pub. No.: WO2014/164382
PCT Pub. Date: Oct. 9, 2014

(65) Prior Publication Data
US 2016/0027124 A1   Jan. 28, 2016

Related U.S. Application Data

(60) Provisional application No. 61/775,869, filed on Mar. 11, 2013, provisional application No. 61/775,485, filed on Mar. 9, 2013.

(51) Int. Cl.
*G06Q 30/00* (2012.01)
*G06Q 40/00* (2012.01)
(Continued)

(52) U.S. Cl.
CPC .............. *G06Q 40/12* (2013.12); *G06Q 30/06* (2013.01); *G06Q 40/00* (2013.01); *G06Q 40/02* (2013.01)

(58) Field of Classification Search
CPC ................................ G06Q 40/00; G06Q 40/02
(Continued)

(56) References Cited

U.S. PATENT DOCUMENTS 7,523,055 B2 * 4/2009 Anderson .............. G06Q 20/04
705/30
7,698,216 B2 * 4/2010 Provinse ................ G06Q 10/02
705/33
(Continued)

FOREIGN PATENT DOCUMENTS

WO   WO2014164382   10/2014

OTHER PUBLICATIONS

Quicken(R), Getting Started with Quicken Home & Business, retrieved on May 27, 2014 at <<http://http-download.intuit.com/http.intuit/CMO/quicken/support/Getting_Started_with_Quicken_Home_and_Business.pdf>>, Manual (online) Intuit, 2006.
(Continued)

*Primary Examiner* — Oluseye Iwarere
(74) *Attorney, Agent, or Firm* — Lee & Hayes, PLLC

(57) ABSTRACT

Techniques for utilizing thematic repositories for transaction management are described herein. The techniques may include receiving data associated with at least one transaction, and associating at least a subset of the data with at least one thematic repository of a plurality of thematic repositories. An individual thematic repository of the plurality of thematic repositories may be configured to aggregate data from a plurality of transactions that are individually determined to be associated with a theme of the individual thematic repository.

20 Claims, 12 Drawing Sheets

(51) Int. Cl.
*G06Q 30/06* (2012.01)
*G06Q 40/02* (2012.01)

(58) Field of Classification Search
USPC .................................................. 705/30, 35
See application file for complete search history.

(56) References Cited

U.S. PATENT DOCUMENTS

| | | | | |
|---|---|---|---|---|
| 7,752,107 | B1* | 7/2010 | Bent | G06Q 20/10 705/35 |
| 8,055,575 | B2* | 11/2011 | Grody | G06Q 40/00 705/37 |
| 8,554,647 | B1* | 10/2013 | Grigg | G06Q 40/02 701/469 |
| 8,768,802 | B2* | 7/2014 | Engle | G06Q 40/123 705/35 |
| 9,542,710 | B1* | 1/2017 | Izrailevsky | G06Q 40/12 |
| 2003/0033228 | A1* | 2/2003 | Bosworth-Davies | G06Q 20/04 705/35 |
| 2004/0002906 | A1* | 1/2004 | Von Drehnen | G06Q 20/10 705/31 |
| 2005/0144125 | A1* | 6/2005 | Erbey | G06Q 20/023 705/40 |
| 2007/0282726 | A1* | 12/2007 | Koester | G06Q 40/00 705/35 |
| 2008/0048019 | A1* | 2/2008 | Petit | G06Q 20/20 235/379 |
| 2008/0208707 | A1* | 8/2008 | Erbey | G06Q 20/023 705/26.8 |
| 2008/0243715 | A1* | 10/2008 | Stellhorn | G06Q 20/10 705/36 R |
| 2009/0037332 | A1* | 2/2009 | Cheung | G06Q 20/10 705/42 |
| 2009/0171709 | A1* | 7/2009 | Chisholm | G06Q 30/06 705/35 |
| 2010/0004981 | A1* | 1/2010 | Katz | G06Q 40/02 705/38 |
| 2010/0057502 | A1* | 3/2010 | Arguelles | G06Q 10/02 705/5 |
| 2011/0137928 | A1* | 6/2011 | Engle | G06Q 40/123 707/769 |
| 2011/0208586 | A1 | 8/2011 | Joa et al. | |
| 2011/0208663 | A1 | 8/2011 | Kennis et al. | |
| 2012/0011054 | A1* | 1/2012 | Grody | G06Q 40/00 705/37 |
| 2012/0185373 | A1* | 7/2012 | Grody | G06Q 40/04 705/37 |
| 2012/0290422 | A1* | 11/2012 | Bhinder | G06Q 20/20 705/21 |
| 2013/0024242 | A1* | 1/2013 | Villars | G06Q 10/00 705/7.33 |
| 2013/0304555 | A1* | 11/2013 | Groarke | G06Q 20/34 705/14.23 |
| 2014/0006282 | A1* | 1/2014 | Friedman | G06Q 20/12 705/44 |
| 2014/0025444 | A1* | 1/2014 | Willis | G06Q 20/3272 705/13 |
| 2014/0180767 | A1* | 6/2014 | Villars | G06Q 30/0205 705/7.34 |
| 2014/0249917 | A1* | 9/2014 | Groarke | G06Q 40/10 705/14.53 |
| 2014/0279304 | A1 | 9/2014 | Lall | |
| 2015/0052035 | A1* | 2/2015 | Calman | G06Q 40/02 705/35 |
| 2015/0100467 | A1* | 4/2015 | Blackhurst | G06Q 40/12 705/30 |
| 2015/0161606 | A1* | 6/2015 | Lee | G06Q 20/405 705/44 |
| 2015/0302405 | A1* | 10/2015 | Pastore | G06Q 40/00 705/44 |
| 2015/0302406 | A1* | 10/2015 | Pastore | G06Q 40/02 705/44 |
| 2015/0356545 | A1* | 12/2015 | Marcuccilli | G06Q 20/322 705/40 |
| 2015/0356583 | A1* | 12/2015 | Sheppard | G06Q 10/06 705/7.34 |
| 2016/0027124 | A1* | 1/2016 | Rojas | G06Q 30/06 705/30 |
| 2017/0161844 | A1 | 6/2017 | Rojas | |

OTHER PUBLICATIONS

The Extended European Search Report dated Oct. 11, 2016 for European application No. 14780012.2, 7 pages.
International Search Report and Written Opinion for Application No. PCT/US2014/022215 dated Jul. 8, 2014, 9 pages.
The Chilean Office Action dated Jun. 29, 2017 for Chilean patent application No. 2536-2015, a counterpart foreign applicaion of U.S. Appl. No. 14/774,047.
The Chilean Office Action dated Jan. 3, 2018 for Chilean patent application No. 2536-2015, a counterpart foreign application of U.S. Appl. No. 14/774,047.
The Mexican Office Action dated Aug. 22, 2017 for Mexican patent application No. MX/a/2015/012116, a counterpat foreign application of U.S. Appl. No. 14/774,047, 4 pages.
The Mexican Office Action dated Feb. 22, 2018 for Mexican patent application No. MX/2017/081622, a counterpart foreign application of U.S. Appl. No. 14/774,047.
The European Office Action dated Apr. 16, 2018 for European patent application No. 14780012.2, a counterpart foreign application of U.S. Appl. No. 14/774,047, 7 pages.
The PCT Search Report and Written Opinion dated Apr. 19, 2018, for PCT Application No. PCT/US18/18450, 8 pages.

* cited by examiner

THEMATIC REPOSITORIES FOR TRANSACTION MANAGEMENT

CROSS REFERENCE TO RELATED PATENT APPLICATIONS

This application is a national stage application of an international patent application PCT/US14/22215, filed Mar. 9, 2014, which claims priority to U.S. Provisional Patent Application No. 61/775,485, filed on Mar. 9, 2013, the entire contents of which are incorporated herein by reference. The international patent application PCT/US14/22215 also claims priority to U.S. Provisional Patent Application No. 61/775,869, filed on Mar. 11, 2013, the entire contents of which are incorporated herein by reference.

BACKGROUND

The process of recording and managing personal and business transactions that have a financial aspect is often complicated, protracted and monotonous. Tracking the various cash disbursements, charges, and itemized receipts for a household or produced during the course of a business trip requires a tremendous amount of time. This does not include the time and expense involved in actually entering the data in the first place. Additionally, accurately tracking and segregating an employee's time between different projects is often difficult.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
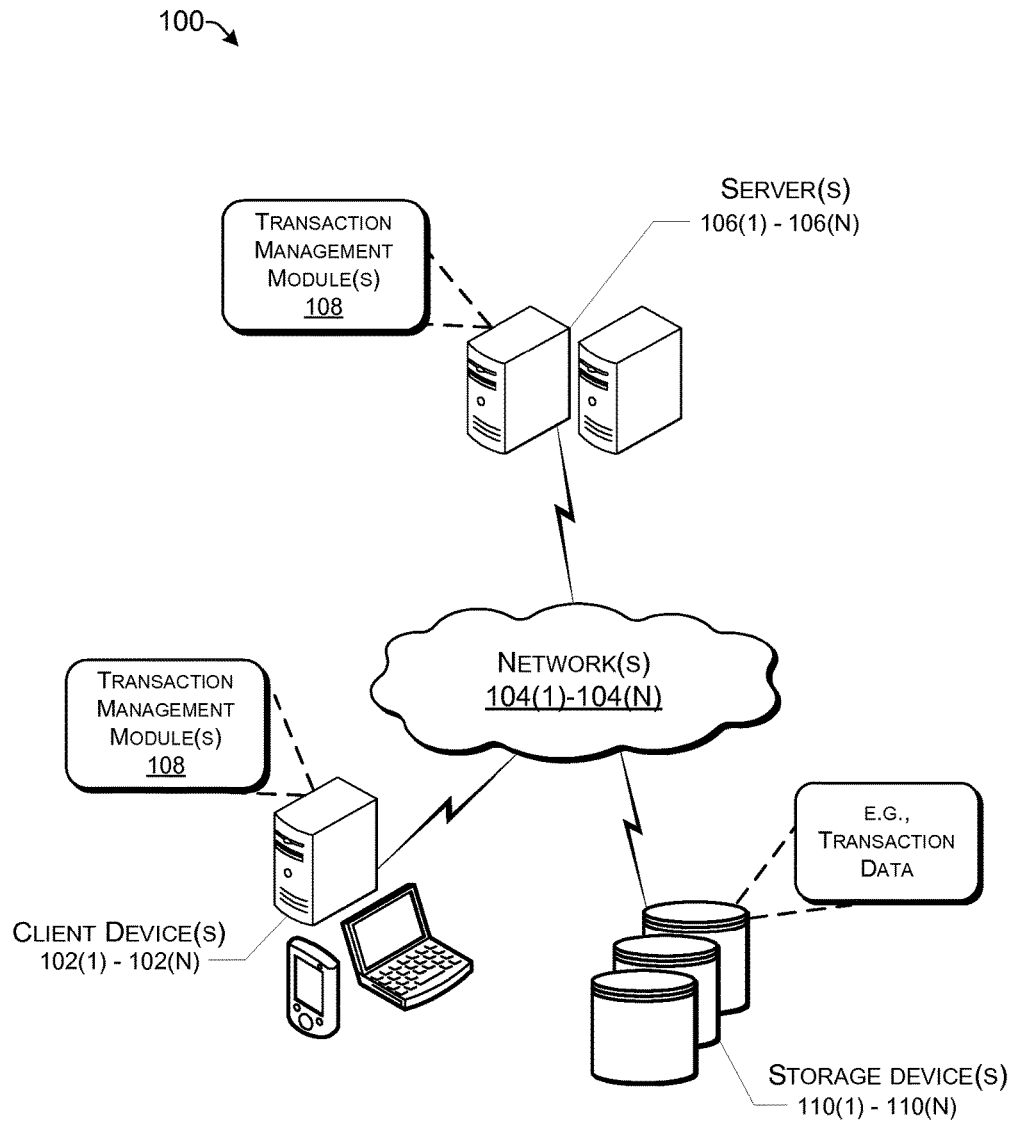
FIG. 1 illustrates an example operating environment in which the techniques disclosed herein may be implemented, in accordance with certain embodiments.

The process of recording and managing personal and business transactions that have a financial aspect is often complicated, protracted and monotonous. Tracking the various cash disbursements, charges, and itemized receipts for a household or produced during the course of a business trip requires a tremendous amount of time. This does not include the time and expense involved in actually entering the data in the first place. Additionally, accurately tracking and segregating an employee's time between different projects is often difficult.

For companies, tracking transactions such as travel and sales expenses is a necessary but cumbersome exercise for both the company as well as their employees, and there is often a duplicate effect in tracking those transactions, importing them into suitable databases, and auditing them for accuracy and compliance with company policies and government regulations. For example, in the U.S., today's business traveler averages four trips per month, up to 25 receipts on average, and spends between $1,200 and $1,500 per trip.

As another example, companies in the construction industry often have several ongoing projects and employ hourly workers who work on more than one project during a day. The companies also often purchase materials in "bulk" that they then use on the various projects. To comply with lender requirements and audits regarding construction financing and draw requests, the construction companies and lenders spend an inordinate amount of time tracking, segregating and confirming the accuracy of expenses and man-hours charged to a particular project.

Organizing, timely recording and then verifying the accuracy of expenses for business travelers and other employees, while necessary for U.S. GAAP accounting, Sarbanes-Oxley compliance, lender requirements and other business reasons, often involves tiresome, repetitive data entry and data checking that waste countless man-hours, reduce employee productivity and cut into company profit. As a result, individuals and companies continue to complain about the merits of expense reporting, citing lack of intuition and insufficient mobile platforms—not to mention being time-consuming and requiring the entering of redundant information. For the more than 6 million U.S. small and medium businesses (SMBs) each employing between one and 500 people—a business sector which contributed substantially to the $252 billion in total U.S. spending on business travel in 2011—the need for intelligent expense tracking and personal transaction management tools continue to manifest strongly.

Individuals or households dealing with their personal finances face similar issues; albeit on a smaller scale. The realm of personal finance has forever been augmented thanks to the Internet, where pen and paper have been replaced with convenient, secure, and automated ways to stay on top of expenses. The online banking industry is the result of consumers' desire to manage their finances either on a home computer or a mobile device. Originally, online banking was exclusively provided by banks, which offered online portals for account management, payments, and more.

Recently, third-party solutions have emerged. The number of financial management websites and other online personal finance management (PFM) solutions have also exploded, with some claiming to help the individual or business track expenses by charts and graphs while others simply provide a semi-automated way to manage expenses. These solutions are so linear in nature that little real benefit is afforded to the user on any grand scale. Furthermore, complicated user interfaces aggravate users who are already seeking an easier solution to the common and frustrating practice of managing personal finances.

In 2011, the American Banking Association reported that, among all consumers, 20% still prefer visiting a bank to conduct a bank transaction or to manage their accounts even if they know that the online solution exists. The primary reason is a lack of usability or other technology/security concerns. Thus, existing solutions have not been fully effective at achieving the convenience and reliability that consumers are looking for in a transaction management tool.

Embodiments of the present disclosure are generally directed to techniques for using thematic repositories of a transaction management platform to facilitate the management of transaction activity, such as automating financial tasks involving receipt tracking, time tracking, expense reporting, and budgeting. The transaction management platform may be used, for example, to manage personal transactions, business transactions, or both. The financial transaction management platform may also include social features that enable collaboration and transaction sharing among entities, such as business and individual subscribers, who track and record their transactions.

Certain aspects of this disclosure are discussed with reference to an Example Use Scenario(s) section below. The Example Use Scenario(s) section provides a practical illustration of techniques involved in the utilization of various aspects of a transaction management platform, including thematic repositories, in accordance with certain embodiments.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Use Scenario(s)

For the purposes of illustrating the utilization of various aspects of a transaction management in a collaborative manner, consider the following example.

A business traveler (User A) who works for Employer X is going on a business trip from Austin, Tex. to Monterrey, Mexico to give a sales presentation. User A also works for Employer X on a project in Austin, Tex. To be reimbursed for business-related expenses regarding the Monterrey Trip, User A is expected to submit receipts or similar documentation showing reimbursable business-related expenses. User A is traveling with a companion (User B) as far as Laredo where User B will visit family.

Employer X also employs an Austin-based computer consultant (User C) on an hourly basis who splits time between the Austin Project and a project in Hutto, Tex. (the "Hutto Project").

Employer X has a company checking account at Bank Y that is used to issue checks regarding the Austin Project and Hutto Project. The Austin Project is financed by a lender (Bank Z) that requires Employer X to submit financial information and draw requests regarding the Austin Project on a weekly basis. Employer X is also required to maintain separate accounts for the Austin Project and Hutto Project, and to accurately segregate time and expenses between these Projects. For this reason, Employer X instructs User A and User C to report their time and expenses working on the Austin Project on a daily basis. Employer X also instructs User C to report his time and expenses working on the Hutto Project on a daily basis.

Employer X initially uses a client device to access the transaction management application and create a transaction management account named "Employer X Account." As part of the creation process, he is assigned a transaction management account email, e.g., EmployerX@tma.com.

After creating the Employer X Account, Employer X logs into the transaction management account by providing a username and a password, and creates a thematic repository named "Monterrey Trip Expenses" to manage transaction activity relating to expenses that will be incurred in connection with User A's Monterrey trip. Employer X also creates thematic repositories named "Austin Project" and "Hutto Project" to manage transaction activity relating to these projects. As used herein, a thematic repository may also be referred to as a "paybook."

Employer X also adds User A and User C to the list of employees who will be invited to collaborate with Employer X regarding thematic repositories. Employer can add, view and/or select employees or other individuals for collaboration in using the transaction management platform in various embodiments.

By using the features provided by a social module of the transaction management platform, Employer X invites User A to access the transaction management application and join the Monterrey Trip Expenses thematic repository as a member so they can both track expenses related to the Monterrey trip. Employer X also sends an email invitation to User A to join the Austin Project thematic repository as a member. Additionally, Employer X sends an email invitation to User C to access the transaction management application and join the Austin Project thematic repository and to join the Hutto Project thematic repository as a member.

Employer X sets permissions that only allow transaction data in the Master Austin Project thematic repository on the transaction management platform (TMP) server regarding User A to be shared with User A and that allow only transaction data in the Master Austin Project and Hutto Project thematic repositories on the TMP server regarding User C to be shared with User C.

Employer X also sends an email invitation to Bank Z to access the transaction management application and join the Austin Project thematic repository. Employer X sets permissions that allow only transaction data in the Master Austin Project thematic repository on the TMP server to be shared with Bank Z that is necessary for Bank Z to process draw requests or otherwise comply with lending requirements.

Because the Monterrey Trip will last several days, Employer X has provided a cash advance of $500.00 to User A. Employer X creates a "User A Collect Account" under Monetary Receivables Accounts for $500.00. Employer X tags the $500.00 advance with the applicable "GL Code" to ensure that his bookkeeping is accurate. Employer X also creates a User A Monterrey Expenses Account under Monetary Debit Accounts to keep track of business expenses that User A submits.

User A receives the invitations from Employer X and accepts the invitations. User A uses a client device to access the transaction management application and create a transaction management account named "User A Account." As part of the creation process, User A is assigned a transaction management account email, e.g., UserA@tma.com. User A logs into the transaction management account and joins the Monterrey Trip Expenses thematic repository and Austin Project thematic repository created by Employer X. These are business-related thematic repositories, so User A places the thematic repositories under the "business" portion of the transaction management account.

Since User A likes to golf, he creates a thematic repository named "Golf" under the "personal" portion of the transaction management account to manage golf-related transaction activity. User A also creates a personal thematic repository named "Laredo Trip" to manage travel-related transaction activity for his trip with User B to Laredo. He adds User B to his list of connections, and invites User B to join the Laredo Trip thematic repository, so that they can both track expenses related to the Laredo trip. User B accepts the invitation and joins the Laredo trip thematic repository after creating his own user account.

Continuing in the personal portion of the transaction management account, User A sets up his accounts at Bank V and Bank W for tracking, and provides the Bank V his UserA@tma.com email address so the account information from Bank V is sent directly to the transaction management platform (TMP) server for processing and input into User A's transaction management account. Bank W does not offer this option and, instead, provides bank statements directly to User A by email in portable document format (PDF). It will be understood that bank statements or other financial transaction data may be presented to the user in a variety of formats other than PDF, and processed in the transaction management account.

User A also enters data regarding the amount of cash he has on-hand and his credit card account information. User A remembers that he still owes $30.00 to User B for the purchase of golf balls earlier in the week and records this data by creating a User B Debit Account in Monetary Debit Accounts. This account is now displayed in the monetary debit area of the dashboard. User A also tags the transaction under the golf thematic repository. User A notices by viewing the dashboard that a monetary debit account already is in place regarding the cash advance of $500.00 from Employer X.

On the way to Laredo, User A and User B stop at a gas station to refuel. They also purchase a snack and golf tees for User A and sunglasses for User B. User A pays because he still owes $30.00 to User B for the golf balls. The gas station cashier gives a receipt to User A that itemizes the purchased items of gas, User A's snack and golf tees, and User B's sunglasses.

Using the transaction management platform on a mobile device with a digital camera, User A takes a photo of the receipt and uses the photo input feature provided by the transaction input module of the transaction management platform.

After the transaction input module determines whether the general format of the digital image is acceptable, the transaction data is routed for quality control to quality control system (QCS) through a network to verify the accuracy and proper format of transaction data and perform other quality control measures.

Using the features provided by the transaction configuration module of the transaction management platform, User A tags the digital representation of the receipt for entry into the "Monterrey Trip Expenses" thematic repository, the "Laredo Trip" thematic repository, and the "Golf" thematic repository.

As part of the configuration, User A configures the transaction data from the digital representation of the receipt by: (1) splitting the gas purchase equally between User A and User B; (2) tagging the snack purchase to the "Monterrey Trip Expenses" thematic repository and "Laredo Trip" thematic repository; and (3) further tagging the snack purchase to the Traveling Category and categorizing it as "food." User A also tags the sunglasses purchase as being assigned to User B in the "Laredo Trip" thematic repository.

The transaction data in User A's member "Laredo Trip" thematic repository is routed to the Master "Laredo Trip" thematic repository on the TMP server. User B, as a member of the "Laredo Trip" thematic repository group, receives detailed information regarding the expenses attributed to each of User A and User B on the Laredo Trip via User B's transaction management account, thereby providing a convenient way of determining the age-old issue of "who owes who what?"

Since User B owes money to User A for the sunglasses purchase and gas purchase, and this amount exceeds the amount that User A owed to User B for golf balls, a User B "collect" account is created in User A's transaction management account and the amount of the difference is displayed on User A's dashboard.

As part of the configuration, User A configures the golf tees transaction data to be identified in the "Golf" thematic repository and "Laredo Trip" thematic repository. User A selects the "Golf" thematic repository for display on the Golf account dashboard, and requests to view a report of transactions within the last two months. User A is provided with data graphics that show him the details regarding money spent with respect to User A's golf hobby. User A sees that money was spent on golf balls, golf grips, gas, snacks, green fees, lodging, and their respective percentages of the total of expenditures within the last two months.

User A further configures the transaction data from the receipt to: (1) create a copy of the image of the receipt; (2) "redact" the golf tees transaction data and sunglasses transaction data since these are not business expenses; (3) authenticate the copy of digital image; and (4) tag the snack and gas purchases to the Monterrey Trip Repository and assign them to Employer X as reimbursable business expenses.

The transaction data in User A's member "Monterrey Trip Expenses" thematic repository, along with the redacted and digitally signed copy of the image of the receipt is routed to the Master "Monterrey Trip Expenses" thematic repository on the transaction management platform (TMP) server. Employer X, as a member of the "Monterrey Trip Expenses" thematic repository group, is provided with immediate detailed information regarding the business expenses incurred by User A.

After dropping off User B in Laredo, User A continues to Monterrey, Mexico. Upon arriving at an office to make a sales presentation, User A is required to pay cash for parking at a self-serve lot that does not provide receipts. The sign at the lot displays the hourly rate and name of the lot. Using the transaction management platform on a mobile device with a digital camera, User A takes a photo of the sign, showing the name of the self-serve lot and the rate charged when he enters the lot. In this case, the transaction data is the image itself and associated information such as geocoding information. This transaction data is collectively referred to in this particular example as the "parking expense transaction data." When User A leaves the lot, User A takes another photo of the sign.

User A uses the currency conversion feature of transaction management platform to convert pesos into U.S. dollars and configures the parking expense transaction data to: (1) create copies of the digital images; (2) configure the images to superimpose a label that identifies the sales call and amount charged for parking in U.S. dollars; and (3) tag the parking expense to the Monterrey Trip Repository and assign them to Employer X as reimbursable business expenses. The parking expense transaction data in User A's member "Monterrey Trip Expense" thematic repository, along with labeled copies of the digital images are routed to the Master "Monterrey Trip Expense" thematic repository on the TMP server. Employer X, as a member of the "Monterrey Trip Expenses" thematic repository group, is provided with immediate detailed information regarding this business expense, including geocoding information that confirms the location of the parking lot and the amount of time that User A parked in the lot.

User A also uses the transaction management platform to enter his hours spent on the Austin Project and tags this information to his member Austin Project repository. User A also enters the mileage for his trip to Monterrey. The data is routed to the Master Austin Project thematic repository on the TMP server.

User C, who also accepted Employer X's invitation, enters his hours spent on each of the Austin Project and Hutto Project in User C's respective member thematic repositories and such information is routed to the Master Austin Project and Hutto Project thematic repositories on TMP server. Employer X can see, in a substantially real-time manner, each of User A's and User C's expenses and time, and can generate one or more reports regarding the projects.

Further, if User A mistakenly tags the golf tees transaction data as a reimbursable business expense and the data is routed to the Master "Monterrey Business Expenses" thematic repository, the transaction management platform flags the golf tees transaction data and allows Employer X to filter it, whether for viewing purposes or for reporting purposes.

Employer X designates its company bank account at Bank Y for management of transaction activity using the transaction management platform. Employer X uses the "drag and drop input" feature of the transaction management platform to input the latest account statement that was sent by Bank Y in PDF format.

After the transaction input module determines whether the format of the digital image is acceptable, the transaction data is routed for quality control (QC) to quality control system (QCS) through a network to verify the accuracy and proper format of transaction data and perform other quality control measures.

Employer X configures the Bank Y transaction data by tagging information relating to the "Austin Project" to the Austin thematic repository and tagging information relating to the "Hutto Project" to the Hutto thematic repository. The Austin Project transaction data in Employer X's member "Austin Project" thematic repository (which includes the shared transaction data from User A, User C, and Bank Y regarding the Austin Project) is routed to the Master "Austin Project" thematic repository on TMP server; and Bank Z, as a member of the "Austin Project" thematic repository group, is provided with detailed information regarding the "Austin Project," according to the permissions given by Employer X.

If Employer X mistakenly tags a non-reimbursable expense (i.e., an expense that, according to lender policy, cannot be reimbursed) to the "Austin Project" thematic repository, then the transaction management platform flags the non-reimbursable expense and allows Bank Z to filter it, whether for viewing purposes or for reporting purposes.

After the trip, User A wants to collect the money owed by User B for the sunglasses and User B's share of gas purchased on the Laredo Trip. User A views the dashboard and notices that the User B Collect Account only shows $20.00 even though User A knows the sunglasses and one-half of the gas expense was $50.00. By clicking on the User B collect account, User A reviews the transaction data detail relating to the amounts owed by User B for the Laredo Trip and also the credit applied from the amount owed by User A to User B for the golf balls. User A sends User B a reminder notification regarding the $20 owed to User A.

User B is able to quickly confirm the amount owed by viewing the dashboard for his transaction management account and clicking on the Owe Account for User A which displays the transaction data detail relating to the amounts owed by User B for the Laredo Trip and also the credit applied from the amount owed by User A to User B for the golf balls.

Example Operating Environment

FIG. 1 illustrates an example operating environment 100 in which techniques described herein may be implemented. The operating environment 100 may include one or more client device(s) 102(1)-102(N), which may be coupled to one or more server(s) 106(1)-106(N), across one or more network(s) 104(1)-104(N). For simplicity of reference, components throughout this disclosure may be referred to in the singular form and in connection with a single generalized reference numeral. For example, the one or more client device(s) 102(1)-102(N) (i.e., the plural form) may be referred to as a client device 102 (i.e., the singular form). Nonetheless, it should be understood that use of the singular form may include the plural form in certain implementations.

The client device 102, the server 106, or both, may include any type of computing device that is generally configured to perform an operation. For example, the client device 102, the server 106, or both, may be implemented as a laptop computer, a desktop computer, a server, a smart phone, an electronic reader device, a mobile handset, a personal digital assistant (PDA), a portable navigation device, a portable gaming device, a tablet computer, a watch, a portable media player, a television, a set-top box, a computer system in a car, an appliance, a camera, a robot, a hologram system, a home-based computer system (e.g., intercom system, home media system, etc.), a projector, an automated teller machine (ATM), a pair of glasses with computing capabilities, and so on.

In certain implementations, a user may use the client device 102 to manage transaction activity. For example, the client device 102, server 106, or both, may be configured with, or otherwise include, one or more transaction management module(s) 108, which may provide the functionality for carrying out the techniques described in this disclosure. For purposes of clarity of this disclosure, the transaction management module(s) 108 may be composed of executable computer code that can be executed by one or more processors. In some embodiments, the transaction management module(s) 108 may include computer code which, when executed by one or more processors, allows a user of the client device 102 to manage transaction activity. The computer code of the transaction management module(s) 108 may be stored locally within the client device 102, or may be provided across the network 104, for example, by the transaction management module(s) of the server 106.

The operating environment 100 may also include one or more storage device(s) 110(1)-110(N). The storage device 110 may store, for example, transaction data. The client device 102, the server 106, or both, may be coupled to the storage device 110 across the network 104. Additionally or alternatively, the storage device 100 may reside locally with respect to the client device 102, the server 106, or both. In certain implementations, the storage device 110 may include one or a combination of computer readable storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include communication media, such as modulated data signals and carrier waves. As such, computer storage media includes non-transitory media.

In some embodiments, the client device 102, the server 106, or both, may be capable of accessing transaction information from one or more bank/financial institution servers (not shown). It should be understood that bank/financial institution servers include servers associated with brokerage companies, credit card companies, financing companies, and the like. The client device 102, the server 106, or both, may provide transaction information received from the bank/financial institution server such that a user may be able to manage transactions corresponding to the transaction information received from the bank/financial institution server. The bank/financial institution server may comprise various components similar to those of the client device 102, the server 106, or both. Thus, it should be understood that any disclosure provided herein with respect to the client 102, the server 106, or both, may also apply to bank/financial institution server.

In some implementations, the operating environment 100 may include a quality control (QC) device or system (not shown). The client device 102, the server 106, or both, may be coupled to the QC device across the network 104. Additionally or alternatively, the QC device may reside locally with respect to the client device 102, the server 106, or both. The QC device may be configured to verify the accuracy and proper format of transaction data received from the client device 102, the server 106, or both, as a result of input by a user, or to perform other quality control measures regarding such transaction data. In some embodiments, the QC device may include or access one or more databases storing templates or other data for verifying the proper format of different types of transaction data. For example, the format of transaction data received from the client device 102, the server 106, or both, may be compared with information stored in the one or more databases. In some embodiments, the QC device is capable of accessing templates, format data, or both, from a bank/financial institution server.

The QC device may perform quality control measures automatically. Additionally or alternatively, at least some of the quality control measures performed by the QC device may not be automatic (i.e., operator involvement may be required). The QC device may comprise various components similar to those of the client device 102, the server 106, or both. Thus, it should be understood that any disclosure provided herein with respect to the client 102, the server 106, or both, may also apply to QC device.

In some implementations, the operating environment 100 may include a transaction data compliance (TDC) unit (not shown). The client device 102, the server 106, or both, may be coupled to the TDC unit across the network 104. Additionally or alternatively, the TDC unit may reside locally with respect to the client device 102, the server 106, or both. The TDC unit may be used to verify that expenses submitted to a company for reimbursement are, in fact, reimbursable under the company's policies. The TDC unit may include one or more databases that store information corresponding to reimbursable expenses. The TDC unit may compare transaction data corresponding to expenses submitted by the user to the acceptable standards for reimbursable expenses stored in the database(s). Thus, expenses contrary to company policies may be flagged for non-compliance.

The TDC unit may be automatic, or may require operator involvement. The TDC unit may comprise various components similar to those of the client device 102, the server 106, or both. Thus, it should be understood that any disclosure provided herein with respect to the client 102, the server 106, or both, may also apply to the TDC unit.

Those of ordinary skill in the art will appreciate that the hardware components and various functional modules depicted in FIG. 1 and elsewhere may vary. The illustrative components are not intended to be exhaustive, but rather are representative to highlight components that are utilized to implement the subject matter disclosed in the present application. For example, other devices/components may be used in addition to or in place of the hardware depicted. In addition, the various components illustrated in storage and memory may be alternatively located in any storage or memory across the network 104. The depicted example is not meant to imply architectural or other limitations with respect to the subject matter of this disclosure.

Example Device(s)

Figure 2:
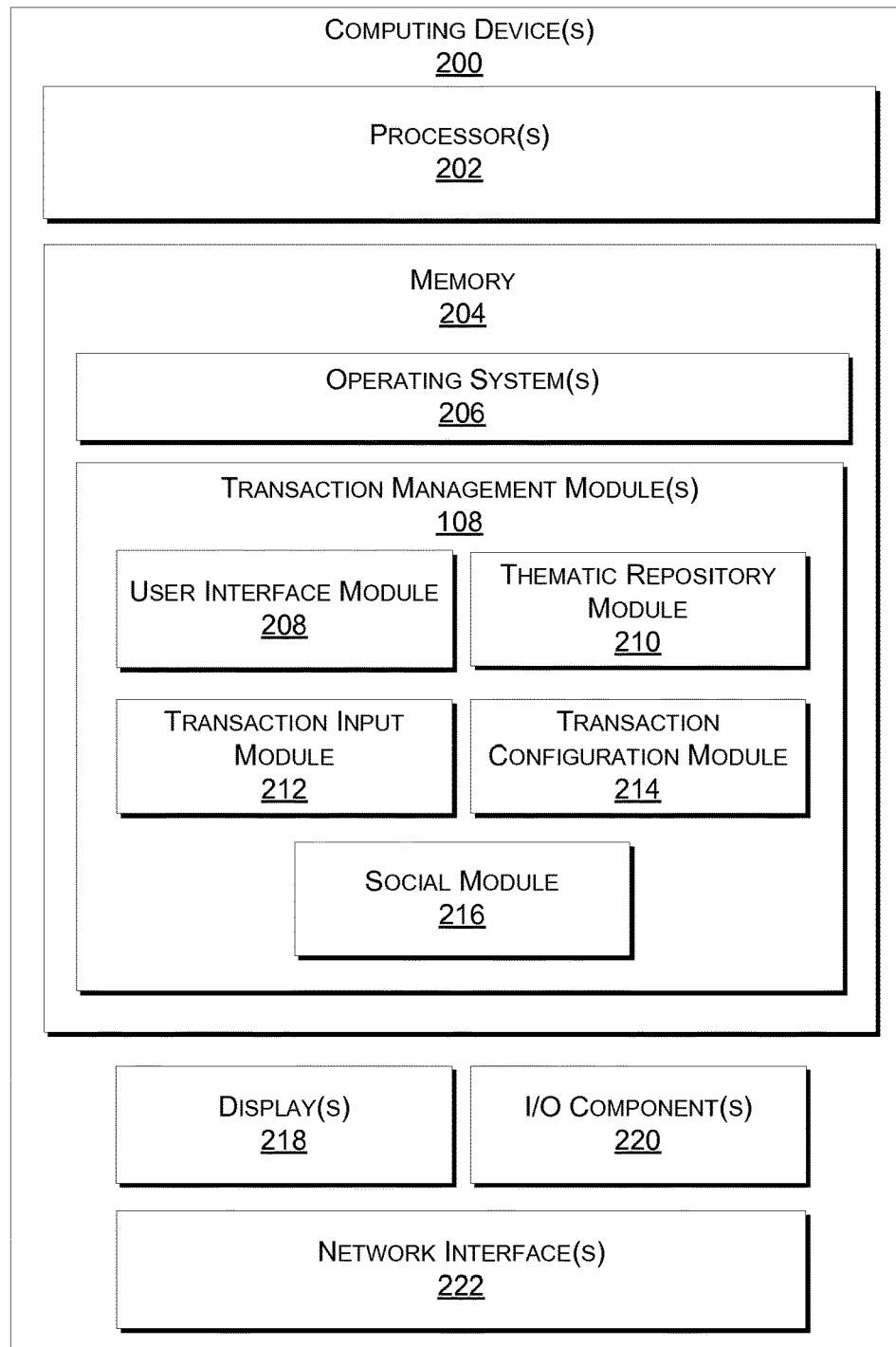
FIG. 2 illustrates further details of one or more example computing device(s) of FIG. 1, in accordance with certain embodiments.

FIG. 2 illustrates further details of one or more example computing device(s) 200 (e.g., the client device 102, the server 106, or both) of FIG. 1. The device 200 may include one or more processors 202, memory 204, one or more operating systems 206, one or more displays 218, one or more input/output (I/O) components 220, one or more network interfaces 222, or any combination thereof.

The memory 204 may include one or a combination of computer readable storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include communication media, such as modulated data signals and carrier waves. As such, computer storage media includes non-transitory media.

The memory 204 may include an operating system 206. Operating system 206 may be any platform that manages the execution of computer code and manages hardware resources. The memory 204 may also include one or more applications, functional modules, or both. The term "module" is intended to represent example divisions of the software for purposes of discussion, and is not intended to represent any type of requirement or required method, manner or necessary organization. Accordingly, while various "modules" are discussed, their functionality, similar functionality, or both, could be arranged differently (e.g., combined into a fewer number of modules, broken into a larger number of modules, etc.). The modules may comprise computer instructions/code that may be stored in the memory 204 and may be executable by the one or more processors 202.

For example, the memory 204 may include transaction management module(s) 108. The transaction management module(s) 108 may comprise executable computer code which, when executed by the processor 202, allows a user to manage transaction activity. Computer program code for the transaction module(s) may be: stored locally within the device 200, provided across network 104, or both.

As will be discussed in further detail below, the transaction management module(s) 108 may include a user interface module 208, a thematic repository module 210, a transaction input module 212, a transaction configuration module 214, a social module 216, or any combination thereof. In certain implementations, the transaction management module(s) 108 may generally receive input from a user, provide output to a user, or both. For example, the device 200 may utilize the functionality provided by the transaction management module(s) 108 to receive transaction-related information input, provide transaction-related information output, or both, to facilitate transaction management. The input may include audio or speech, text, touch, or gesture input received through a sensor of the device 200.

I/O components 220 may be configured to allow a user to interface with the device 200 via one or more I/O devices. The I/O components 220 may provide an interface for such devices as a display 218, a keyboard (not shown), a mouse (not shown), a camera (not shown), an optical reader (not shown), a touchpad (not shown), or any combination thereof. The display 218 may include, for example, a liquid crystal display (LCD), a plasma display, a cathode ray tube (CRT) monitor, a touch screen, any other kind of output display mechanism, or any combination thereof.

Example Transaction Management Module(s)

The transaction management module(s) 108 may include a user interface module 208, a thematic repository module 210, a transaction input module 212, a transaction configuration module 214, a social module 216, or any combination thereof.

The user interface module 208 may cause a user interface to be provided to a user. The user interface may be used as a vehicle for operating the functionality provided by the transaction management module(s) 108, such as allowing the user to input data, receive data, view data, manipulate data, configure data, or any combination thereof. The input data may cause the transaction management module(s) 108 to perform various tasks. In certain instances, the user interface module 208 may be configured to provide a user interface that suits the particular device 200 being used by the user. For example, information may be presented to the user in a different manner when displayed on a mobile phone than when displayed on a personal computer.

In some embodiments, the user interface of the transaction management module(s) 108 may be provided to a user via a web browser [e.g., software as a service (SaaS)], via a downloadable client application, or both. A user may be required to create a transaction management account in order to access/utilize the services provided by the transaction management module(s) 108.

Creating the transaction management account may involve the user providing certain requested personal information (e.g., name, username and/or email address), setting a secure password, and/or verifying that the user is a human and not a machine. In certain embodiments, verifying that the user is a human and not a machine may be carried out by asking the user to drag and drop a menu item to a certain location. For example, the user may be presented with a word or an image, and the user may be asked to: recognize and select a corresponding word or image, and/or drag and drop a corresponding word or image to a certain location in the proximity of the presented word or image. Verifying that the user is a human and not a machine may also be carried out by asking the user to complete a CAPTCHA, a challenge-response test requiring the user to type letters and/or digits corresponding to those presented in a distorted image. However, verifying that the user is a human and not a machine may be carried out by employing any other method of attempting to prevent automated software from performing actions that degrade quality of service.

Upon establishing a transaction management account, a user may be able to log in to the transaction management account by providing a username and/or an email address and a password, or any other suitable log in credential(s) suitable for securely managing access to the user's transaction management account.

Figure 3:
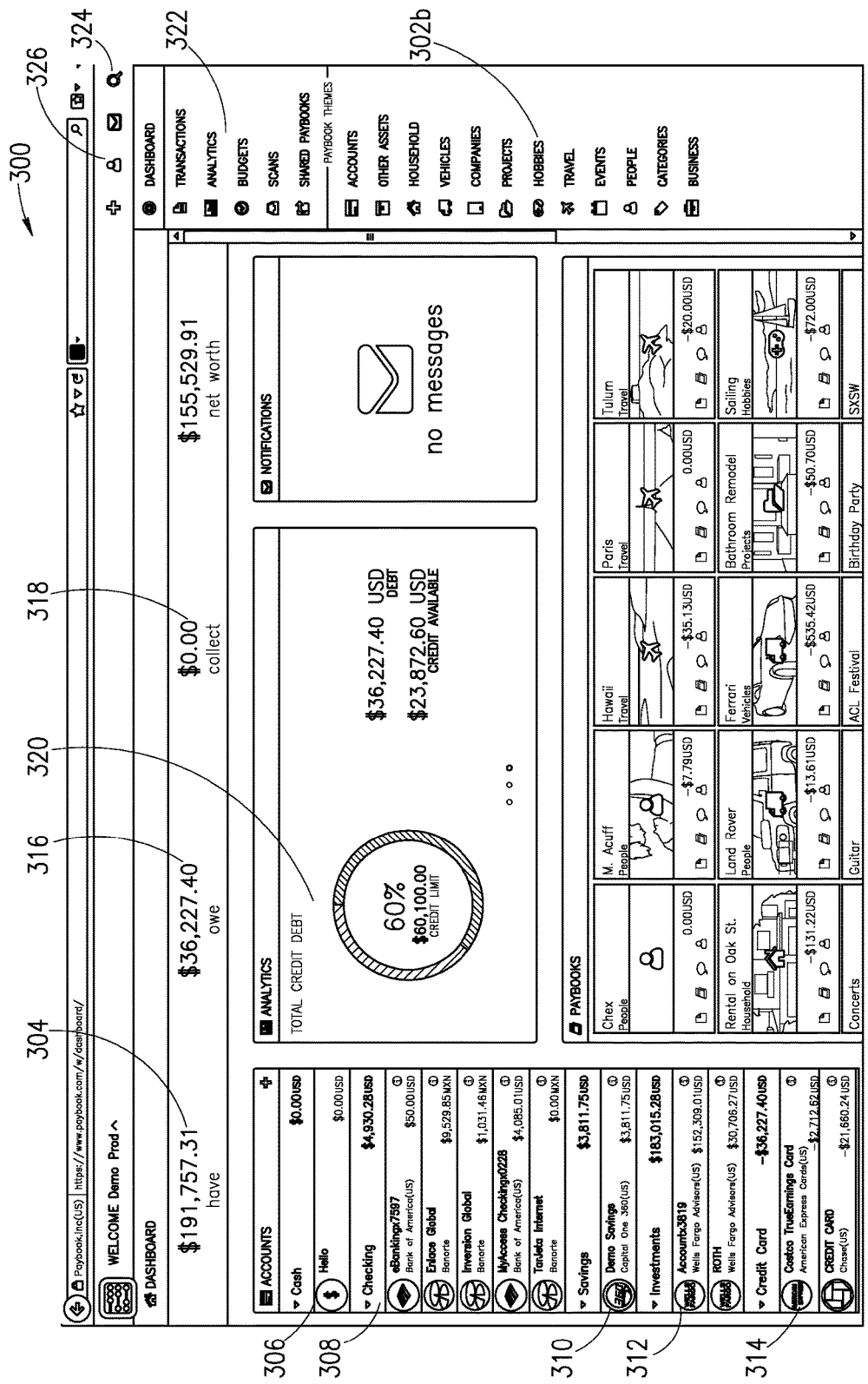
FIG. 3 illustrates an example user interface display, in accordance with certain embodiments.

Once logged in, a user may be provided with a summary view related to features provided by the transaction management module(s) 108. This summary view is also referred to herein as a "master dashboard." FIG. 3 illustrates an example user interface display of a master dashboard 300, in accordance with certain embodiments. The master dashboard may be shown in a default configuration, highlighting a set of features commonly used or desired by users. The default configuration of the master dashboard, as well as the specific features available to the user may vary depending on the status of the user who commonly logs into transaction management account. For example, the default configuration of the master dashboard 300 provided to an individual who uses the transaction management platform primarily for personal use may be different than the default configuration provided to a business owner who uses the transaction management platform primarily for business operations.

The default configuration of the master dashboard 300 and specific features provided may also vary depending on the type of user who commonly logs into transaction management account. For example, the default configuration of the master dashboard 300 and available features for employees of a construction company may be different than the default configuration and features provided to the outside salespeople of a computer company.

Available features not fully detailed in the default configuration of master dashboard 300 may be accessed via links that provide drill-down paths to views or pages highlighting various levels of detail (i.e., providing varying levels of granularity) regarding such features. In some embodiments, the user can customize the master dashboard 300 such that the master dashboard 300 highlights the features most commonly used by that particular user. Although a certain configuration of features is illustrated in the master dashboard 300 of FIG. 3, it will be understood that the configuration is provided merely for illustrative purposes, and that the master dashboard 300, or any other aspect of the user interface, is not be limited to any particular configuration of features.

The master dashboard 1300 includes an area for featuring thematic repositories 302 (also referred to herein as "paybooks"). The thematic repository module 210 (FIG. 2) may provide the functional aspects related to the thematic repositories 302. A user may create a thematic repository 302 to manage transactions that have one or more attributes under a common theme as defined by the user. The user may create each of the thematic repositories 302 to manage transaction types that correspond to the theme of the thematic repository. The name the thematic repository 302 such that the name is descriptive of the theme associated with the thematic repository 302. In some embodiments, a thematic repository 302 may be categorized under one or more other thematic repositories 302. For example, a first thematic repository 302 may be associated with a theme related to, but more narrowly defined than, a theme associated with a second thematic repository 302. That is, in some embodiments, a thematic repository 302 may have a parent-child relationship with another thematic repository 302.

The master dashboard 300 may include a monetary asset area 304 for identifying money that a user has, such as in the user's cash accounts 306, bank accounts (e.g., checking accounts 308, savings accounts 310, etc.), investment(s) accounts 312, or any combination thereof. Bank accounts may include any type of accounts at a financial institution or brokerage house worldwide. Cash accounts can include the user's "safe," "cookie jar," "wallet," or any other repository where the user stores cash or cash equivalents.

The master dashboard 300 may include a monetary debit area 316 for identifying money that the user owes in connection with user's credit card accounts 314 and "IOU" accounts. Credit card accounts 314 include any type of debit account involving the use of a credit card, credit line or similar payment mechanism. "IOU" accounts include amounts owed by the user to other individuals that are typically handled on an informal basis.

The master dashboard 300 may include a monetary receivables area 318 for identifying money that the user is owed in connection with "Collect" accounts. "Collect" accounts include amounts owed to the user by other individuals that are typically handled on an informal basis.

In some embodiments, all accounts that the user sets up via the transaction management account may be listed in the master dashboard 300. In other embodiments, only select bank accounts or other accounts may be listed. For example, the user may select one or more bank accounts to list in the master dashboard 300, or the user may set a certain number of bank accounts that may be shown in accordance with a user-determined parameter. As another example, the user may set the master dashboard 300 to show the five bank accounts with the highest balances, or the user may set the master dashboard 300 to show any bank account that satisfies a balance threshold. Similarly, the user may have options regarding the listing and configuring of other accounts described herein for display on the master dashboard 300.

The master dashboard 300 may display relevant or desired information corresponding to accounts created by the user, such as, but not limited to: bank name, balance, account number, type of account (e.g., checking, savings, etc.), country in which the account is held, date of the last transaction associated with the account, or any combination thereof.

Balances for the accounts may be displayed in any currency, or in any combination of currencies desired, along with the corresponding currency symbol(s). In some embodiments, the master dashboard 300 or pages available for linking from the master dashboard 300 may contain a currency conversion feature (not shown) that allows the user to display, calculate, or both, monetary information in one or more currencies by selecting from a plurality of currencies at the applicable exchange rate. In other embodiments, the user may select the default currency when setting up a particular account.

In some embodiments, the user may click on or otherwise select a listed account or thematic repository 302 displayed in the master dashboard 300 to access additional information about the account, category or thematic repository, including detail about the transactions associated with the account, category, or thematic repository.

Figure 4:
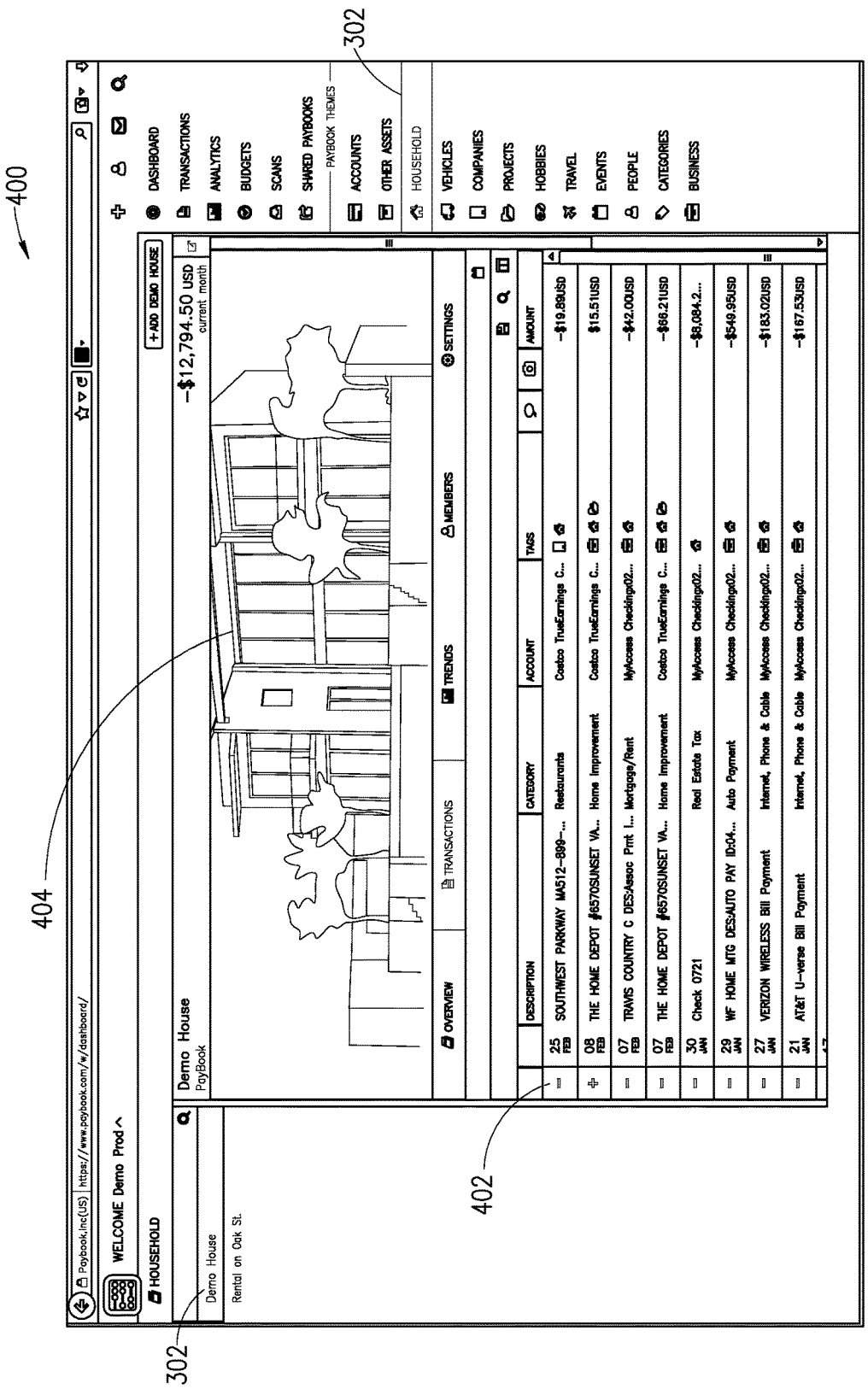
FIG. 4 illustrates another example user interface display, in accordance with certain embodiments.
Figure 5:
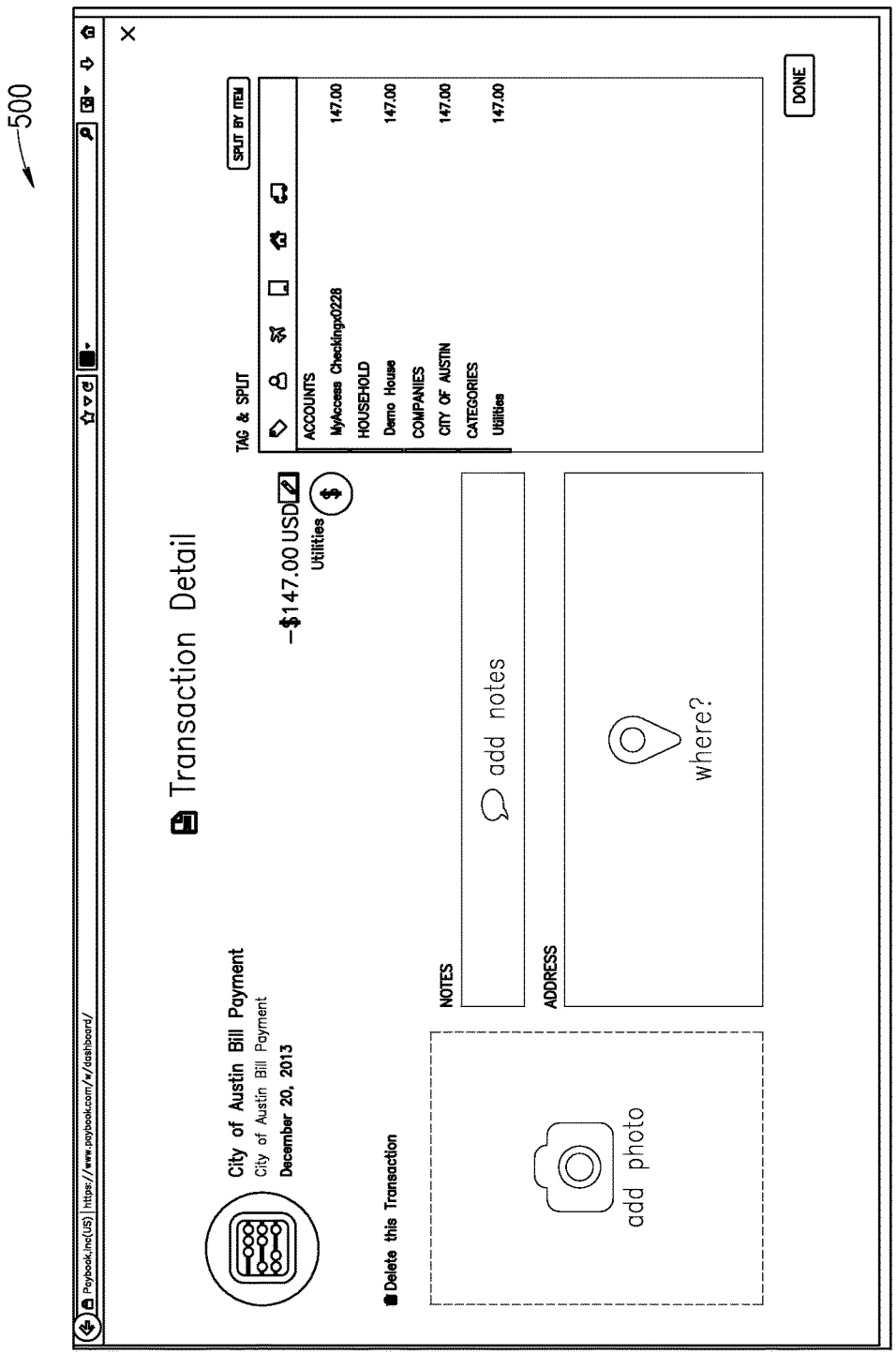
FIG. 5 illustrates yet another example user interface display, in accordance with certain embodiments.

In some embodiments, if the user clicks on or otherwise selects the name of a particular account or thematic repository 302, the user is presented with a summary view or "account dashboard" associated with that account or thematic repository 302. FIG. 4 illustrates an example user interface display of an account dashboard 400, in accordance with certain embodiments. The account dashboard 400 may include many of the same or similar features as the master dashboard 300.

The master dashboard 300, the account dashboard 400, or both, may further include a "transaction display area" 402 (FIG. 4) that displays transaction-related data associated with a particular account or thematic repository 302. In some embodiments, the transaction display area provides a list view of the most recent transactions associated with a particular account or thematic repository 302. For example, the transaction display area 402 may list the five most recent transactions corresponding to a particular account. Similarly, using the facts of the Example Use Scenario(s) section, the transaction display area 402 may list the ten most recent transactions taking place in connection with the Laredo Trip repository if User A selects the thematic repository "Laredo Trip." The user may have the option of customizing the transaction display area 402.

From the transaction display area 402, the user may be able to drill-down to further details of an individual transaction. FIG. 4 illustrates an example user interface display of a transaction detail 500, in accordance with certain embodiments.

Referring back to FIG. 3, the master dashboard 300 may include a data graphics/analytics area 320. In some embodiments, the data graphics area 320 may include any type(s) of data graphic(s) suitable for reporting acquired data in a manner useful or desired by the user. A non-exhaustive list of data graphics types may include pie charts, bar graphs, line graphs, pictographs, tables, or any combination thereof. It will be understood that each account dashboard 400 may have a similar data graphics area 320 that reports data associated with the particular account or thematic repository 302.

Taking the facts of the Example Use Scenario(s) section, if User A selects the thematic repository 302 "Laredo Trip," the data graphics area 320 of the account dashboard 400 might display a pie chart reporting statistics for the Laredo Trip thematic repository. The pie chart might show various child thematic repositories 302 (e.g., "Food," "Gas," and "Golf"), and their respective percentages, identifying the transactions related to the Laredo Trip thematic repository 302. Each of the child thematic repositories 302 may be a part of one or more other parent thematic categories 302. For example, the descriptive child thematic repository 302 "Food" may be used to describe one or more transactions within the scope of each of the "Personal" and "Home" thematic categories 302. Similarly, the descriptive child thematic repository 302 "Food" may be used to describe one or more transactions within the scope of the "Monterrey Trip Expenses" repository. Thus, a particular transaction is not limited to an exclusive association with a single thematic repository 302.

It should be understood that the data graphics area 320 may report statistics for a variety of features within the transaction management account. In other words, the data graphics area 320 is not limited to reporting statistics for thematic repositories 302. Further, in some embodiments, data graphics may be provided by default or by user request in one or more areas other than the master dashboard 300 and the account dashboard 400 of the transaction management account.

The master dashboard 300 may include one or more menus 322. In some embodiments, the user may select a menu 322 to navigate out of the master dashboard 300 and to another section of the transaction management account. In other embodiments, selecting a menu 322 modifies at least some of the information being displayed on the master dashboard 300 of the transaction management account.

The master dashboard 300 may include a search bar 324. The user may search through transaction management account data via the search bar 324. Additionally or alternatively, the user may search and/or navigate through transaction management account data in any suitable manner, such as by using drop-down selected filters, radio button selected filters, voice commands and/or a tag cloud. It should be understood that account dashboard 400 may have a similar features that allow the user to search and/or navigate through transaction data associated with a particular account.

The master dashboard 300 may include a notification area 326. The notification area 326 may provide information to the user about transactions by a member of a shared thematic repository 302. Taking the facts of the Example Use Scenario(s) section, the notification area 326 may provide information to User A about actions taken by User B in connection with the shared Laredo Trip thematic repository.

The organization and placement of the areas in the master dashboard 300 of FIG. 3 and the account dashboard 400 of FIG. 4 [and aspects of the user interface(s) in general] is merely illustrative and not limited by the present disclosure, and variations in the placement, size, and shape of the areas would be readily apparent to those of ordinary skill in the art of user interface design.

The transaction input module 212 may be configured to enable the input of transaction data in a variety of ways. As an initial matter, the user may be allowed to input information for setting up various accounts, thematic repositories, connections/collaborators and the like, in order to more efficiently track financial transactions.

Figure 6:
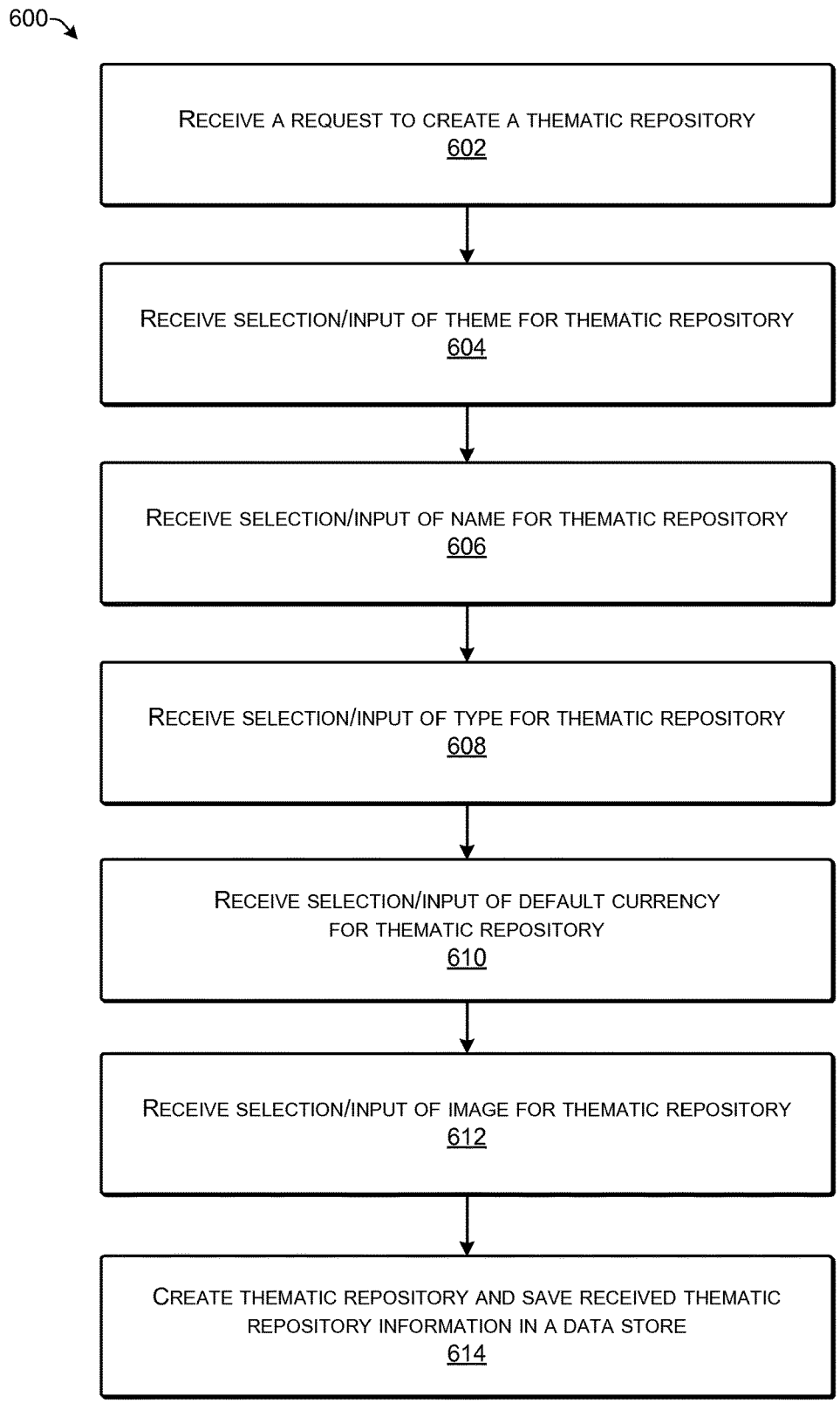
FIG. 6 illustrates an example process to create a thematic repository, in accordance with certain embodiments.
Figure 7:
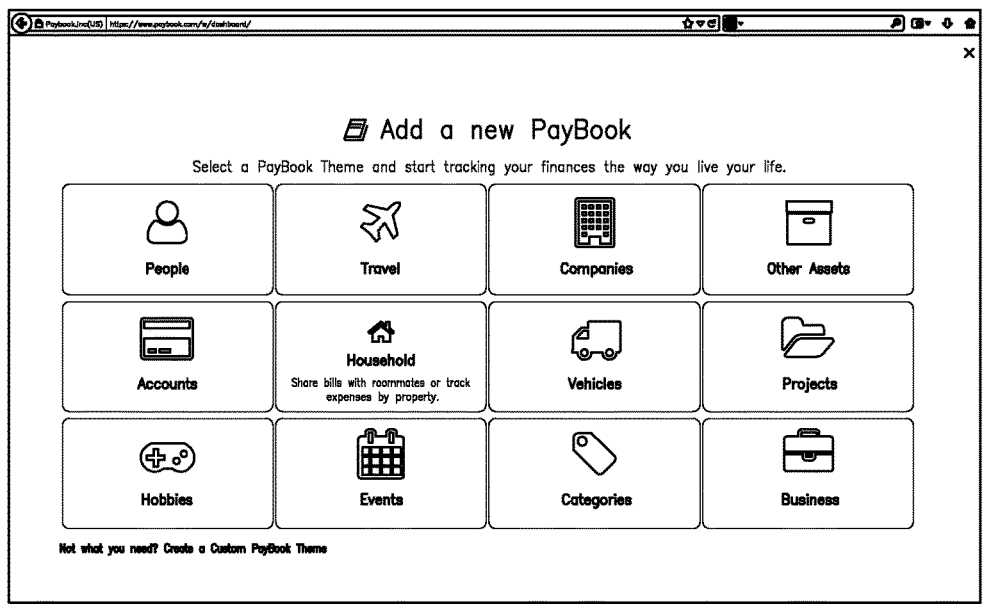
FIG. 7 illustrates example user interface displays for creating a thematic repository, in accordance with certain embodiments.
Figure 7:
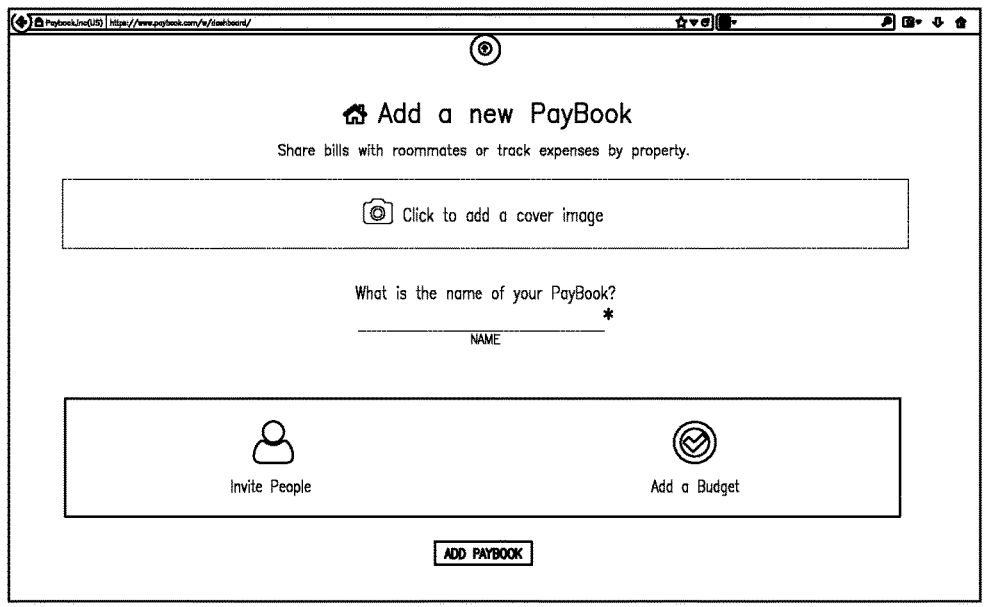

FIG. 6 illustrates an example process 600 to create a thematic repository, in accordance with certain embodiments. At 602, the transaction input module 212 may receive a request to create a thematic repository. The user may send or otherwise indicate a request to create a thematic repository by, for example, selecting a menu item from the master dashboard 300 or other user interface presented to the user. At 604, the transaction input module 212 may receive a selection or other input of a theme associated with the thematic repository to be created. At 608, the transaction input module 212 may receive a selection or other input of a name associated with the thematic repository to be created. In some embodiments, the transaction input module 212 may also receive a selection or other input of a default currency associated with the thematic repository to be created, at 608. Upon receiving various selections or other input from the user in association with the thematic repository to be created, the transaction input module 212 may create the thematic repository in accordance with the user inputs and save received thematic repository information in a data store, at 610. FIG. 7 illustrates example user interface displays 700 for creating a thematic repository, in accordance with certain embodiments.

The transaction input module 212 may be configured to enable the creation of various financial accounts to allow the tracking of financial transaction information. The transaction input module 212 may also be configured to allow a user to input information about one or more businesses for which the user would like to manage transaction activity using the transaction management platform (e.g., via the transaction management module(s) 108). For example, the user may also be allowed to input data regarding employees that might collaborate with the user regarding certain transaction activity using the transaction management platform.

Figure 8:
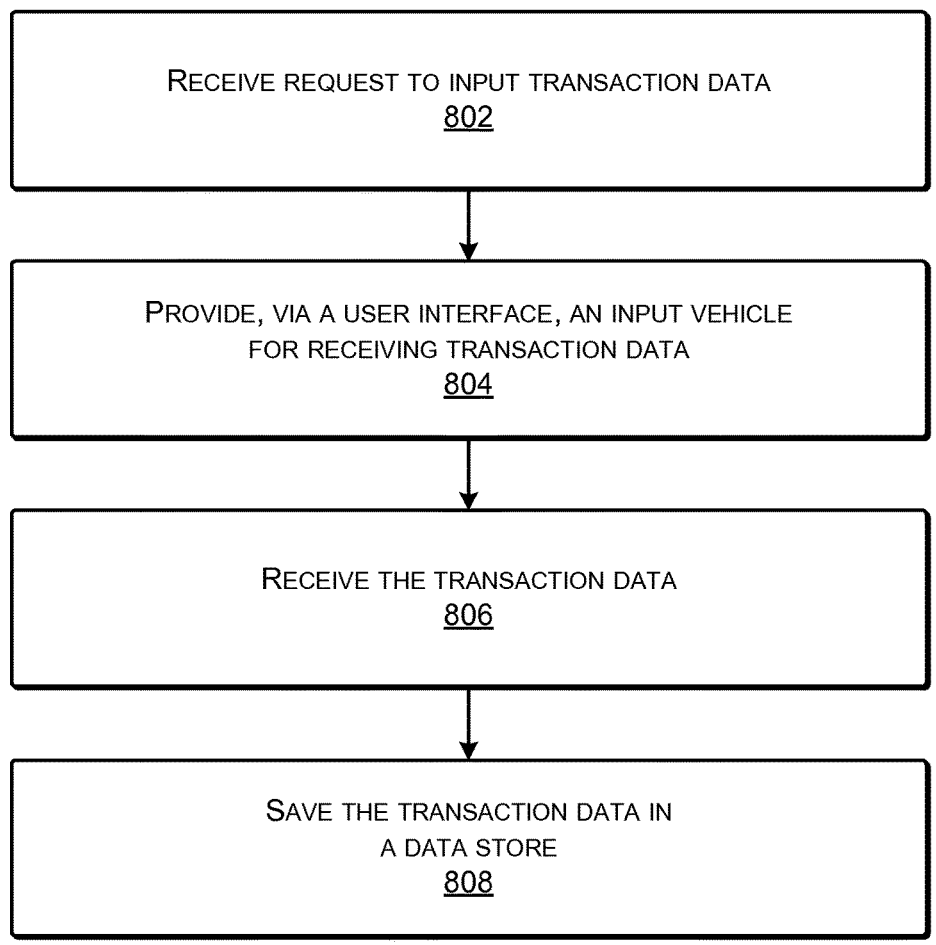
FIG. 8 illustrates an example process to receive transaction data, in accordance with certain embodiments.

In addition to enabling input of information in setting up various features of the transaction management account, the transaction input module 212 may also be configured to enable input of transaction data that will be tracked in the transaction management account. FIG. 8 illustrates an example process to receive transaction data, in accordance with certain embodiments.

At 802, the transaction input module 212 may receive a request from a user to input transaction data. For example, the user may transmit the request via the user interface. The request may comprise providing any suitable indication that the user wants to input transaction data, such as, for example, selecting a menu item designated for initiating the input of transaction data.

The transaction data may include one or more data items related to identifying or otherwise describing transaction-related information. For example, continuing to use the facts of the Example Use Scenario(s) section, User A purchases a snack, gas and golf tees at a gas station along the way, and also purchases a pair of sunglasses for User B at the same time. Terms used to describe these items and the amount paid for the items is considered transaction data. Other possible parameters that may be considered transaction data with respect to the purchase transaction include, but are not limited to: the name of the business from which the items were purchased; the location of the business (including geocoding information); the date of purchase; the time of purchase; the method of payment; and details regarding the method of payment such as the debit or credit card used, the bank account associated with card, the name of the bank, the bank account type, and the bank account number; or any combination thereof. In connection with the purchase example provided, the transaction-related information relating to the snack is collectively referred herein as the snack transaction data; the transaction data relating to the gas is collectively referred to herein as the gas transaction data; the transaction data relating to the golf tees is collectively referred to herein as the golf tees transaction data and the transaction data relating to the sunglasses is collectively referred to herein as the sunglasses transaction data.

At 804, the transaction input module 212 may provide, via the user interface, an input vehicle for receiving transaction data. The input vehicle may be any mechanism by which the user may provide input that contains, at least in part, transaction data. The transaction data may reside alongside non-transaction data, and the transaction data may either be automatically recognized, or the transaction data may be designated as such on-the-fly or at some later time by the user.

In some embodiments, the transaction input module 212 may include or access a default library of transaction data that it may automatically recognize. Additionally or alternatively, the user may be able to define a library of transaction data that the transaction input module 212 may be able to automatically recognize.

At 806, the transaction input module 212 may receive the transaction data. At 808, the transaction input module 212 may store the received transaction data. For example, the transaction input module 212 may cause the transaction data to be stored in the storage device 110 or in the memory 204.

The transaction input module 212 may be configured to enable the designation of bank accounts and tracking of financial information relating to those accounts. In some embodiments, bank/financial institution servers of one or more of the banks servicing bank accounts that the user designated for transaction activity management may be linked to the transaction management module(s) 108 such that transaction information from the respective bank accounts is pushed or otherwise downloaded to the storage device 110, the memory 204, or the transaction input module 212 via the network 104. Transaction information push availability and frequency may vary depending on factors such as bank policy, bank location, and/or user settings.

In some instances, the transaction input module 212 may receive transaction information from a bank in real-time or substantially real-time frequency, i.e., at or near the time each transaction occurs. When the transaction input module 212 receives the transaction information, the transaction input module 206 may provide the transaction information to the user via the user interface.

Additionally or alternatively, the transaction input module 212 may be configured to receive transaction information from a bank each time the bank issues the user's bank account statement. When the transaction input module 212 receives the transaction information, the transaction input module 212 may provide the transaction information to the user via the user interface.

In some embodiments, the transaction input module 206 may receive transaction information from a bank when the user manually downloads the information from a bank/financial institution server. When the transaction input module 212 receives the transaction information, the transaction input module 212 may provide the transaction information to the user via the user interface.

Figure 9:
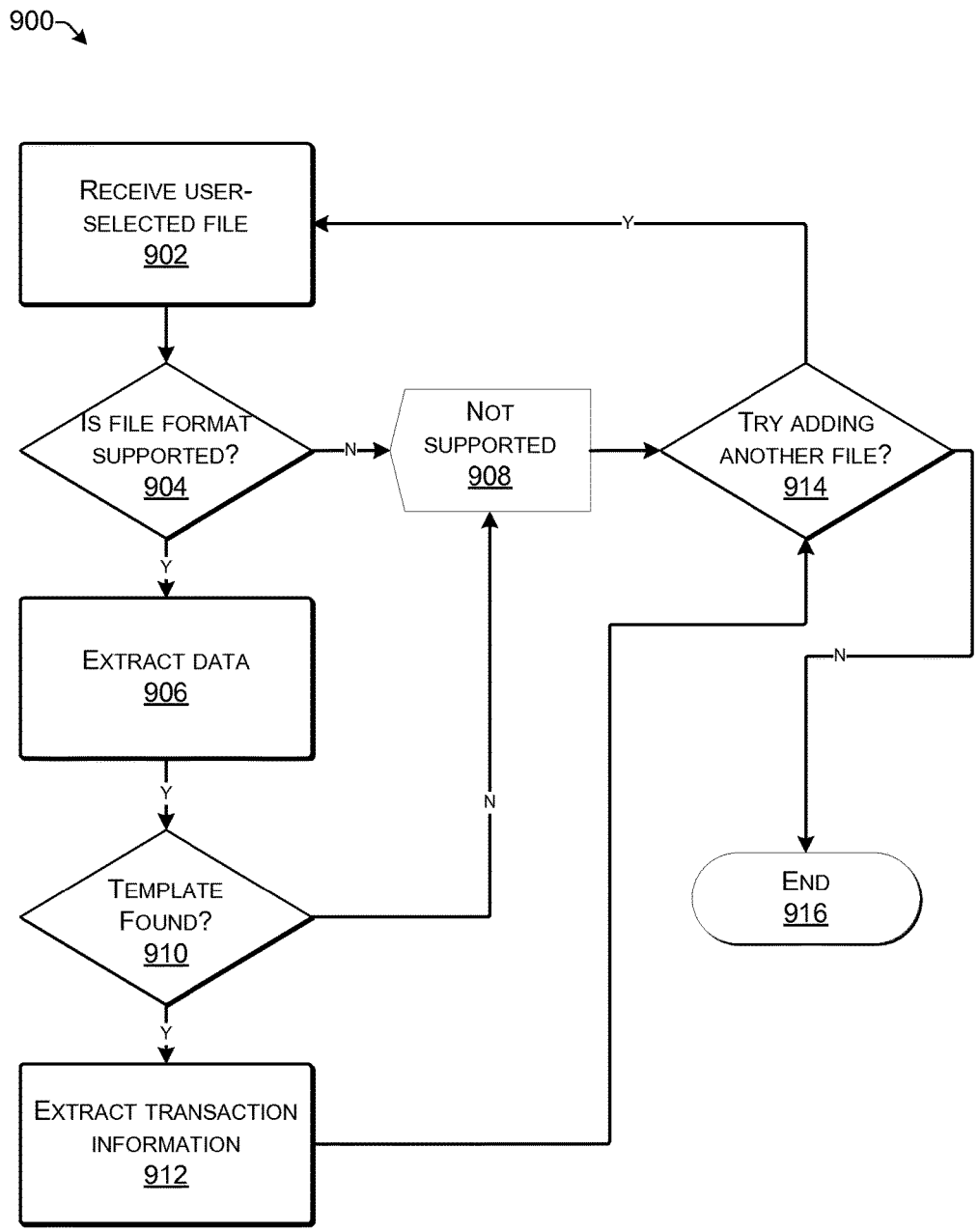
FIG. 9 illustrates an example process to extract transaction information from a user-selected file, in accordance with certain embodiments.

FIG. 9 illustrates an example process 900 to extract transaction information from a user-selected file, in accordance with certain embodiments. The user-selected file may comprise one or more files that include transaction data that the user wants to manage via the transaction management account. For example, the one or more selected files may comprise bank statements. Depending on a bank's policy(ies), the bank may issue a bank statement as a password-protected file. The user may also be able to password-protect the bank statement file. If the bank statement is not recognized by the transaction input module 212 as being associated with an existing bank account (i.e., a bank account already added to the transaction management account), then the transaction input module 212 may add the bank account so that the user is able to manage transaction activity related to the bank account via the transaction management account.

At block 902, the transaction input module 212 may receive a user-selected file; for example, the transaction input module 212 may receive a bank account statement containing bank account transaction data. In certain embodiments, the user may select the file to input bank account transaction data via a drag-and-drop input feature, i.e., by dragging the file from a first location to a second location, and dropping the file at the second location. The first location may be, for example, the operating system's "desktop" or a local file manager window. The second location may be a transaction data input-designated area in the user interface of the transaction management platform. Additionally or alternatively, the user may select the file to input the bank account transaction data by browsing to the file via a dialog box provided by the transaction input module 212 as the vehicle for providing transaction data input.

In certain embodiments, the user may select a digital representation of one or more transactions to be received by the transaction input module 212. For example, the user may select a digital representation of the bank statement or certain transactions listed in the bank statement to input bank account transaction data by using a photo input feature.

At 904, the transaction input module 212 may determine whether the format of the selected file is acceptable/supported. In some embodiments, the input file is transmitted to the QC device across the network. The QC device may determine whether the format of the selected file is acceptable along with performing other quality control measures. Acceptable file formats may include any file format in which financial transaction data is electronically communicated to the user, including but not limited to portable document format (PDF).

If the file format is supported, then data may be extracted from the file, at 906. Then, at 910, the QC device may determine whether the data pattern/format of the file matches the pattern/format of a stored template in a database residing in or accessible to the QC device. For example, if User A inputs a bank statement, the QC device may determine whether the format of the bank statement matches the format of an existing template in a database to allow bank account transaction data to be properly entered and organized. That is, the transaction input module 212 may parse the file for transaction data and organize the transaction data in accordance with predetermined parameters. For example, if the user inputs a bank statement, and the QC device determines the format of the bank statement matches the format of a stored template a database, then the bank account transaction data in the bank statement may be parsed and organized according to organization and other parameters of the stored template.

In some embodiments, text that is not machine-encoded may be converted to machine-encoded text using optical character recognition (OCR) technology or the like. As discussed above, the transaction input module 212 may include or otherwise access a default library of transaction data that it may automatically recognize. Additionally or alternatively, the user may be able to define a library of transaction data that the transaction input module 212 may be able to automatically recognize.

Returning to 904, if the file format is determined to be unacceptable/not supported, then the process continues at 908, where the transaction input module 212 may prompt the user that the file is not supported.

Similarly, if the user inputs a bank statement, and the QC device, at 910, determines that the format of the bank statement does not match the format of a stored template in a database, then the user may be notified that the format of the bank statement is not recognized. User A may either manually input the bank account transaction data or wait until notified the QC device has obtained a matching template. The QC device may obtain a template of the bank statement from the bank as depicted or create a template for organizing the bank account transaction data from the bank statement input.

At 914, the transaction input module 212 may determine whether the user has selected a new file. If so, then the process 900 reverts to 902, where the transaction input module 212 may receive the new user-selected file. If the user does not try adding another file, then the process may end.

In some embodiments, the user may select a plurality of files to be received by the transaction input module 212. For example, the user may use the drag and drop input feature to drag multiple files simultaneously from a first location to a second location, and drop the files simultaneously in the second location. In other words, the user may drag-and-drop the files in parallel. However, the user may also be allowed to select multiple files in series.

In some embodiments, the user has the option of inputting data by taking a digital photo of the financial transaction data with a device having a digital camera using a "photo input feature." Using the facts of the Example Use Scenario(s) section regarding data input into the transaction input module 212, consider User A employed by Employer X. As an initial matter, User A may input data to create the Laredo Trip thematic repository. In addition to receiving financial data from banks and credit card companies and inputting and configuring the data in the transaction management platform in the various manners disclosed above, User A may also receive receipts such as the gas station receipt and similar proofs of payment while traveling to Laredo. User A may have the option of inputting data by creating a digital image of the receipt using the photo input feature and associating the transaction data with the Laredo trip thematic repository.

When a receipt is not available, the user may also have the option of using the photo input feature to take a digital photo of the item purchased or of identifying information associated with such item, such as a label or bar code. As a further example, continuing with the facts of the Example Use Scenario(s) section, User A may use the photo input feature to input the parking expense transaction data.

The transaction configuration module 214 may provide for the configuring of transaction data. For example, the transaction configuration module 214 may receive a request from a user to configure the transaction data. The request may comprise providing any suitable indication that the user wants to configure transaction data, such as, for example, selecting a menu item designated for initiating the configuration of transaction data. In some instances, however, the transaction configuration module 214 may proactively present the user with the option to configure transaction data, or may configure transaction data according to default parameters without user request.

The transaction configuration module 214 may provide, via the user interface, a vehicle for configuring the transaction data. The user may configure transaction data by editing text or graphics displayed to the user. Further, the user may configure transaction data by selecting menu items via the user interface or in any manner suitable for transmitting configuration instructions to the transaction configuration module 214.

In some embodiments, the configuration of transaction data may generate configuration data, and the transaction configuration module 214 may associate the generated configuration data with the transaction data. The transaction configuration module 214 may store the transaction data and/or the associated configuration data. For example, the transaction data and/or the associated configuration data may be stored in the storage device 110 or in the memory 204.

In certain implementations, the transaction configuration module 214 may receive a digital representation of one or more transactions via the transaction input module 212. The digital representation may be presented to the user via the user interface displayed on the device 200. For example, the digital representation may comprise a purchase receipt that includes one or more transactions. The transaction configuration module 214 may parse the digital representation to identify one or more transactions comprising configurable transaction data. For example, continuing with the facts of the Example Use Scenario(s) section, the transaction configuration module 214 may parse the digital representation of the purchase receipt for the snack, gas, golf tees and sunglasses. The configurable transaction data may comprise information displayed to the traveler in descriptive terms "Gas," "Snack," "Golf tees," and "Sunglasses;" and corresponding values "$W," "$X," "$Y," and "$Z." It should be understood that displayed configurable transaction data in this example may also include other information such as a time/date stamp, receipt number, and identifying information relating to the vendor. The transaction data may also comprise information that is not displayed to the traveler, such as geocoding information.

Continuing with the facts of the Example Use Scenario(s) section, User A may also use the photo input feature to input the parking expense transaction data via the transaction input module 212. The transaction configuration module 214 may parse the digital representation of the photo. In this example, the configurable transaction data may comprise displayed configurable transaction data such as the image and may also comprise information that is not displayed to User A such as geocoding information associated with the digital photo.

The transaction configuration module 214 may provide, via the user interface, a vehicle for configuring the configurable transaction data within the digital representation. In some instances, the user may configure transaction data by editing text or graphics displayed to the user. Further, the user may configure transaction data by selecting menu items via the user interface. When the device 200 provides a touch screen or similar technology, the user may configure transaction data using touch screen gestures to indicate how the user wants to configure the transaction data. However, the user may configure transaction data in any manner suitable for providing configuration instructions to the transaction configuration module 214.

In some embodiments, the configuration of transaction data may generate configuration data. The transaction configuration module 214 may associate the configuration data with the transaction data.

Figure 10:
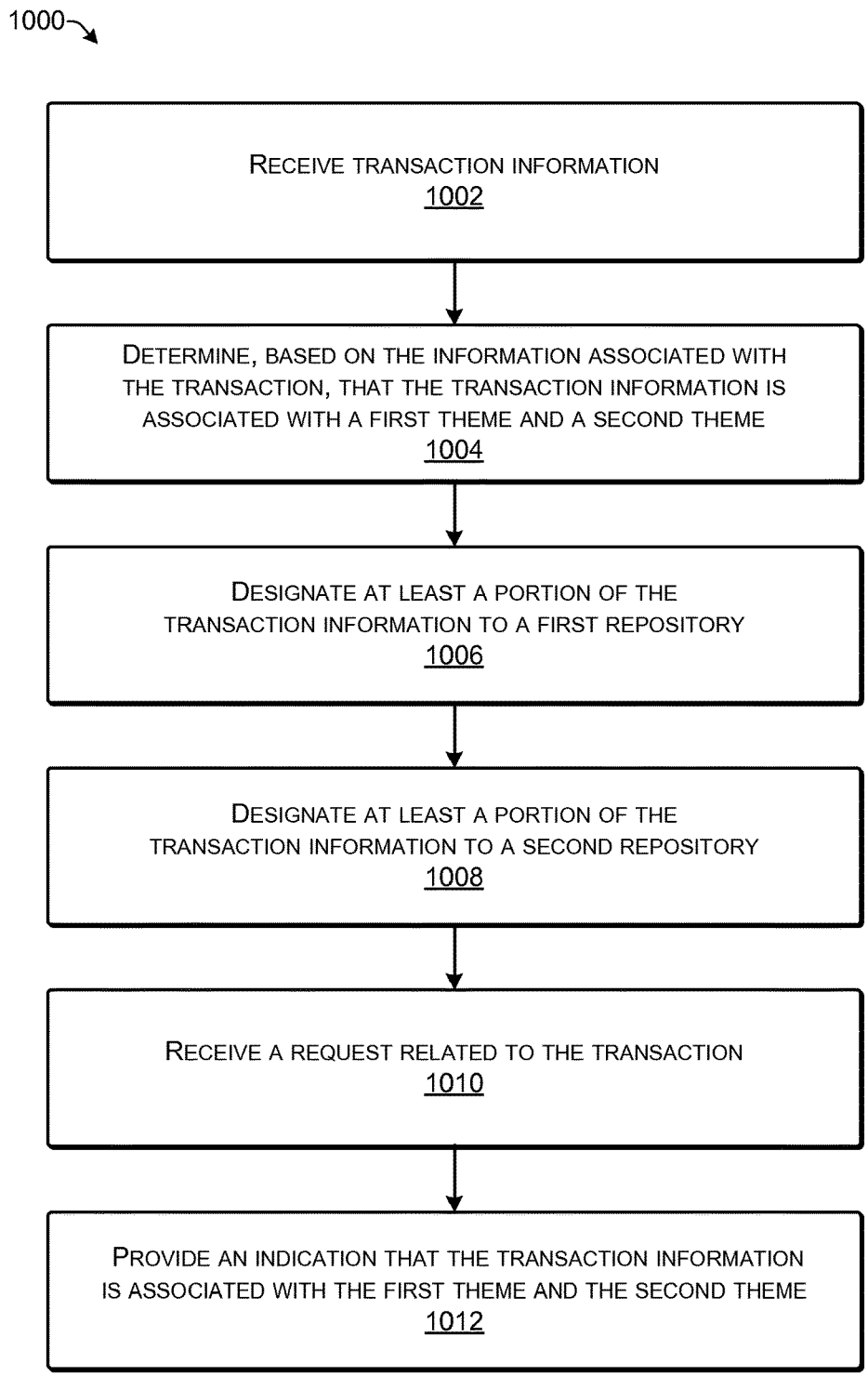
FIG. 10 illustrates an example process to designate transaction information to thematic repositories, in accordance with certain embodiments.

FIG. 10 illustrates an example process 1000 to designate transaction information to thematic repositories, in accordance with certain embodiments. At 1002, the transaction management module(s) 108 may receive transaction information. For example, the transaction information may be associated with a financial transaction. Receiving information associated with a financial transaction may include receiving bank statement information. Additionally or alternatively, the receiving information associated with the financial transaction may include receiving purchase receipt information.

At 1004, the transaction management module(s) 108 may determine, based on the information associated with the financial transaction, that the financial transaction is associated with a first theme and a second theme.

At 1006, the thematic repository module 210 may designate at least a portion of the information associated with the financial transaction to a first repository. The first repository may be configured to provide an aggregation of information associated with a plurality of financial transactions that are individually determined to be associated with the first theme. At least a portion of the information associated with the financial transaction may be designated to the first repository automatically. For example, at least a portion of the information associated with the financial transaction may be designated to the first repository automatically based at least in part on one or more predetermined rules. Additionally or alternatively, at least a portion of the information associated with the financial transaction may be designated to the first repository manually.

At 1008, the thematic repository module 210 may designate at least a portion of the information associated with the financial transaction to a second repository. The second repository may be configured to provide an aggregation of information associated with a plurality of financial transactions that are individually determined to be associated with the second theme. At least a portion of the information associated with the financial transaction may be designated to the second repository automatically. For example, at least a portion of the information associated with the financial transaction may be designated to the second repository automatically based at least in part on one or more predetermined rules. Additionally or alternatively, at least a portion of the information associated with the financial transaction may be designated to the second repository manually.

In some instances, at least a portion of the information associated with the financial transaction may be designated to the first repository automatically and at least a portion of the information associated with the financial transaction may be designated to the second repository manually, or vice-versa.

At 1010, the thematic repository module 210 may receive a request related to the financial transaction. In response to a request related to the financial transaction, an indication that the financial transaction is associated with the first theme and the second theme may be provided, at 1012.

The social module 216 may enable the user to manage transaction activity socially. For example, the social module 216 may provide for the integration of one or more social networks. A social network may be provided internally such that a user of the transaction management platform may interact with other users of the transaction management platform. Further, external social networks may be integrated within the transaction management platform via third party applications, thereby allowing the user of the transaction management platform with users of the external social networks.

Figure 11:
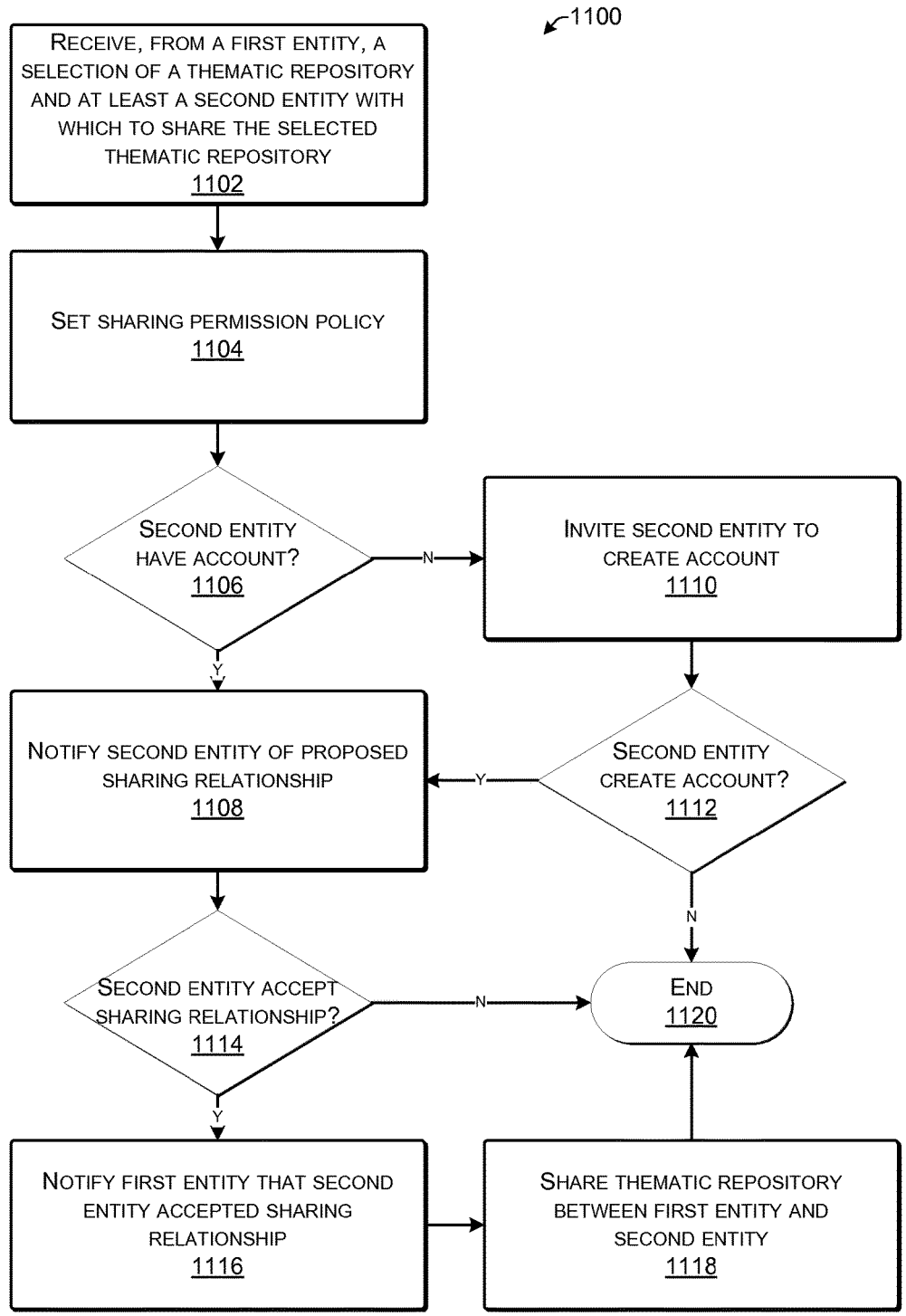
FIG. 11 illustrates an example process to share a thematic repository between multiple entities, in accordance with certain embodiments.

FIG. 11 illustrates an example process 1100 to share a thematic repository between multiple entities, in accordance with certain embodiments. At 1102, the social module 216 may receive, from a first entity, a selection of at least a second entity with which to share the selected thematic repository. At 1104, a sharing permission policy may be set. In some instances, the user may set the sharing permission policy. In other instances, a default or a system-defined sharing permission policy may be set. The sharing permission policy may define the proposed sharing relationship between the first entity and the second entity. That is, the sharing permission policy may define rules with respect to what can and what cannot be shared between the first entity and the second entity.

At 1106, the social module 216 may determine whether the second entity has a transaction management account. If the second entity has a transaction management account, then the social module 216 may notify the second entity of the proposed sharing relationship, at 1108. The social module 216 may also determine whether the second entity accepts the proposed sharing relationship, at 1114. If the second entity accepts the sharing relationship, then the social module 216 may notify the first entity that the second entity accepted the sharing relationship, at 1116. At 1118, the social module 216 may share the thematic repository between the first entity and the second entity.

If, at 1106, it is determined that the second entity does not have a transaction management account, then the social module 216 may send an invitation to the second entity to create a transaction management account. The social module 216 may do so automatically, or at the request of the first entity. At 1112, the social module 216 may determine whether the second entity creates a transaction management account. If the second entity does not create a transaction management account, then the process 1100 may end. Similarly, if the second entity does not accept the proposed sharing relationship, then the process 1100 may end.

Figure 12:
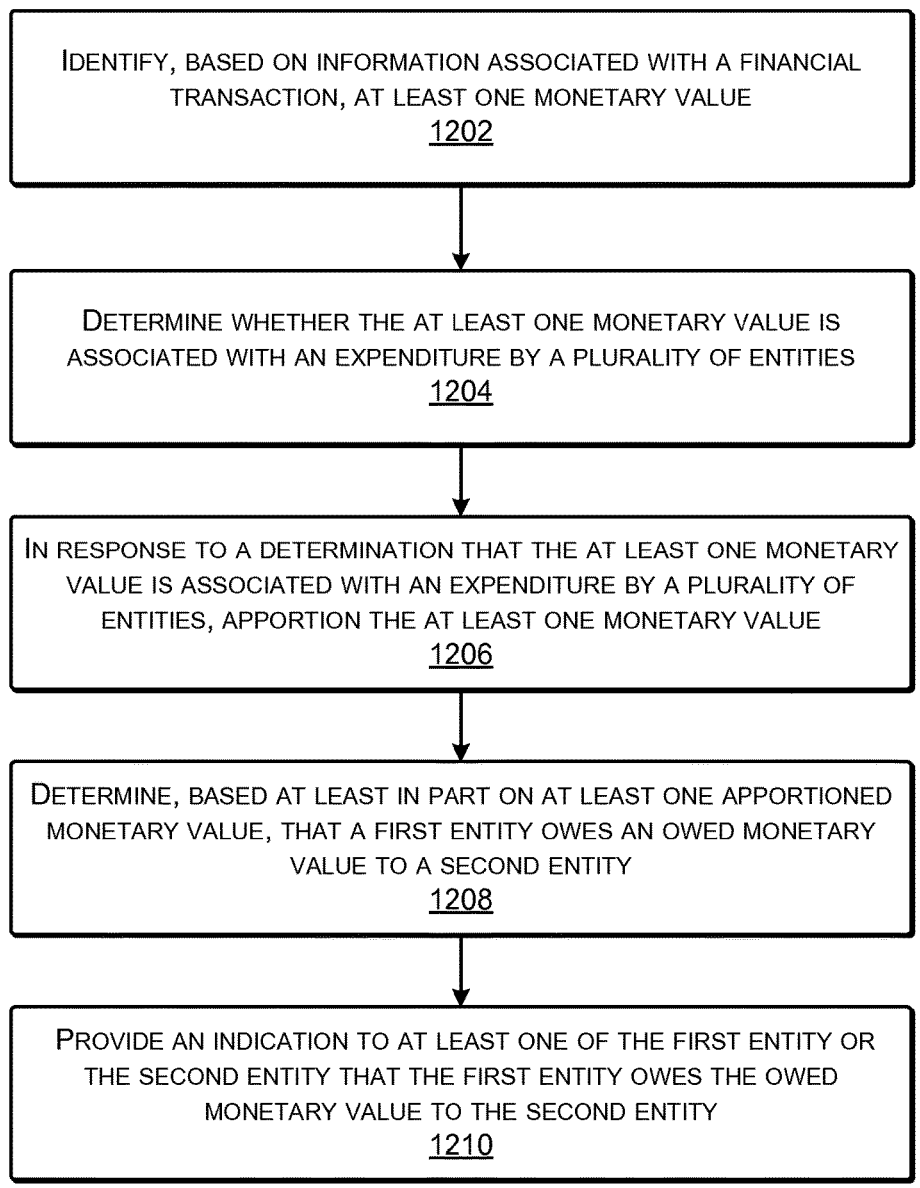
FIG. 12 illustrates an example process to apportion a monetary value between multiple entities, in accordance with certain embodiments.

FIG. 12 illustrates an example process 1200 to apportion a monetary value between multiple entities, in accordance with certain embodiments. At 1202, the transaction management module(s) 108 may identify, based on information associated with a financial transaction, at least one monetary value. At 1204, the transaction management module(s) 108 may determine whether the at least one monetary value is associated with an expenditure by a plurality of entities.

In response to determining that the at least one monetary value is associated with an expenditure by a plurality of entities, the transaction management module(s) 108 may apportion the at least one monetary value, at 1206.

At 1208, the transaction management module(s) 108 may determine, based at least in part on at least one apportioned monetary value, that a first entity owes an owed monetary value to a second entity.

At 1210, the transaction management module(s) 108 may provide an indication to at least one of the first entity or the second entity that the first entity owes the owed monetary value to the second entity. In some instances, at least a portion of the owed monetary value may be transferred to the second entity. For example, the first entity may transfer at least a portion of the owed monetary value to the second entity. Additionally or alternatively, a third entity benefactor of the first entity may transfer at least a portion of the owed monetary value to the second entity. In response to a transfer of at least a portion of the owed monetary value to the second entity, the owed monetary value may be updated to an updated owed monetary value. For example, the updated monetary value may be a difference between the owed monetary value and the at least a portion of the owed monetary value transferred to the second entity. An indication may be provided to at least one of the first entity or the second entity that the first entity owes the updated monetary value to the second entity.

Example Process(es)—Creating Business Profiles

In certain implementations, processes for uploading/sharing a logo for a business profile may include prompting the user to select a logo image. The process may then proceed to upload a temporary file. Once the temporary file is uploaded, the uploaded image may be resized/cropped. The logo may be saved. The process may then proceed to switching the current profile to a new business identification (ID). The new business dashboard may then be displayed.

In certain implementations, processes for creating employee accounts/profiles to link to an employer/company account may include prompting the user for a first name. The process may proceed to prompting the user for a last name and an email address. The user may be further prompted to select an existing department or enter a new department name. Once the information has been entered by the user, the input may be validated and a request to create a new employee account may be generated. A determination may be made as to whether the department exists. If the department exists, an employee profile may be created. The process may then proceed to sending an activation email to the employee email address. After sending the email, the process may wait for user activation. A determination may then be made as to whether the user's email is linked to a thematic repository. If the user's email is linked to a thematic repository, then the user may be prompted to approve an employee status with an existing account. The process may then link the employee to the company.

If the user's email is not linked to a thematic repository, then the user may be prompted to determine if the user has an existing account to link. If the user has an existing account to link, then the user may be prompted to sign in to the account that is to be linked. A determination may be made as to whether the account is authenticated. If the account is authenticated, then the user may be prompted to approve an employee status with an existing account. The process may then continue as discussed above.

If the account is not authenticated, the user may again be prompted to sign in to the account to link. The process may then continue as discussed above.

If the user does not have an existing account to be linked, an account creation form may be presented. The process may then continue to creating the user profile. After creating the user profile, the process may link the user to the company.

If the department does not exist, then a new department listing may be created. After adding the new department to the existing departments, the process may proceed to creating an employee profile. The process may then continue as discussed above.

In certain implementations, a template of employees may be processed. In some instances, all employees may be processed. Employees may also be processed by company department. Upon processing the template of employees, the user can view the employees and departments.

In certain implementations, processes for the creation of employee accounts from a file may include prompting the user to select an input source. If the input source is a web service, a determination may be made as to whether the source is from a web service file or a direct connection. If the source is a web service file, the user may be prompted to upload the web service file. The process may then proceed to parsing the web service file for data. A list of employees may be created based at least in part on the parsed data.

If the source from the web service is a direct connection, then the user may be prompted for direct connection credentials (e.g., host, port, username, password, etc.). The process may then proceed to requesting data from a service. The process may then proceed to parsing received data and creating a list of employees.

If the input source is a file, then the user may be prompted to upload the file. A determination may be made as to whether the file is in an acceptable format. If the file is in an acceptable XLS format, the process may proceed to parsing XLS information and generating a list of employees. If the file is in an acceptable XML format, the process may proceed to parsing the XML structure for matching fields and generating a list of employees. If the file is in an acceptable CSV file, the process may proceed to parsing the rows for headers. The user may be prompted to select which columns correspond to one or more of first name, last name, email address, and department name. The information obtained from the CSV file may be used to generate a list of employees.

If the file selected as the input source is not in an acceptable format, then the user may be informed that the file was unable to be uploaded. The user may be prompted to upload another file. The process may then continue as discussed above.

Once a list of employees is generated, the process may proceed to adding an employee account, profile, or both, for each employee on the list. A determination may be made as to whether each employee's corresponding department already exists. If the department does not exist, a new department listing may be created. The user may be prompted to customize a company activation email, and the activation email may then be sent to employees.

In certain implementations, processes for updating employee information may include receiving an employee's identification (ID) to get employee data. The process may also include receiving the employee's department ID to get department data. The user may be presented with information associated with the employee, such as the employee's first name, last name, email address, and department. The user may be presented the option to edit the employee data. If the user opts to edit the employee data, the process may continue to changing the output fields to input fields, and the user may be prompted to edit the employee information (e.g., first name, last name, and, email address, etc.). The process may then make a determination as to whether the changed data is valid.

The user may also be prompted to edit the department listing. A determination may be made as to whether the department exists. If the department exists, the process may make a determination as to whether the changed data is valid. If the department does not exist, the process may continue to creating a new department listing before proceeding to determine if the changed data is valid.

If the changed data is valid, then the employee data may be updated, and the user may be notified that the employee data has been updated. If, on the other hand, the changed data is not valid, then the user may be informed of a validation error. The output fields may again be changed to input fields, and the process may then continue as discussed above.

Example Process(es)—Tagging Transaction Data with GL Codes

In certain implementations, processes for tagging transaction data with GL codes may prompt the user for a label. The user may also be prompted for a name. A determination may be made as to whether the inputs are valid. If the inputs are valid, then a GL code may be created. The process may then proceed to reloading the GL code listings, and the GL codes may be received. A determination may be made as to whether there are additional GL codes to be added. If there are additional codes to be added, then the user may be prompted for a label. The process may then continue as discussed above.

If the inputs are not valid, the user may again be prompted for a label. The process may then continue as discussed above.

In certain implementations, processes for updating the GL code for category may include showing the user existing codes and categories. The user may be prompted to drag a code on top of a category. A determination may be made as to whether the category has a GL code assigned to it. If the category does not have a GL code assigned, the process may proceed to attaching the GL code to the category. The updated category and the associated GL code may be displayed to the user.

If the category has a GL code assigned to it, the process may include detaching the existing GL code. A new GL code may then be attached to the category. The process may then continue as discussed above.

Example Process(es)—Creating/Adding Financial Accounts

In certain implementations, processes for adding financial accounts may include causing a message to be displayed that prompts the user to select an account type. A determination may be made as to whether the user selects to add a cash account or a bank account.

If the user selects to add a cash account, then the process may proceed to receiving account data (e.g., account name, starting balance, default currency, etc.) from the user. The process may proceed to creating the cash account and storing data related to the cash account in a data store.

If the user selects to add a bank account, then a message may be caused to be displayed that prompts the user to enter the name of a bank. A determination may be made as to whether the bank is an existing bank. If the bank is an existing bank, then a determination may be made as to whether the bank supports a sync application (e.g., YODLEE®). If the bank supports a sync application, then a message may be caused to be displayed that prompts the user to enter bank login credentials, such as a bank username and password. The bank credentials may be saved in a data store. The process may continue to waiting for the scheduled task to initiate.

The bank login credentials may then be sent to the bank's sync application. A determination may be made as to whether the bank login credentials are correct. If the bank login credentials are correct, then a determination may be made as to whether there is a requirement to answer a security question. If there is a requirement to answer a security question, then a message may be caused to be displayed that prompts the user to answer the bank security question. Upon receiving an answer to the bank security question, the answer may be sent to the sync application. A determination may be made as to whether the answer to the security question is correct. If the answer to the security question is correct, then financial information may be received from the bank.

If the bank login credentials are incorrect, then the user may again be prompted to enter bank login credentials and the process may continue as discussed above.

If either the bank is not an existing bank or the bank does not support a sync application, then a message may be caused to be displayed that prompts the user to select a bank statement file. The user may be presented with the option to drag and drop one or more bank statements, and data from the one or more bank statements may be imported as discussed below.

Example Process(es)—Importing Transactions from User-Selected File

In certain implementations, processes for importing transactions may include receiving a user-selected file. A determination may be made as to whether the file is of a supported format. If the file is of a supported format, then a determination may be made as to whether the file is password protected. If the file is password protected, then a determination may be made as to whether the password is stored. If the password is stored, then a determination may be made as to whether the password is correct. If the password is correct, then data may be extracted from the file and an attempt may be made to find a supported template for the file.

A determination may be made as to whether a template pattern that supports the file can be found. If a template pattern that supports the file is found, then an attempt may be made to extract accounts from the file. A determination may be made as to whether the extracted accounts already exist. If so, then there may be no need to add the accounts as new accounts. The process may proceed to extracting transactions from the file. A determination may be made as to whether the transactions already exist. If the transactions already exist, then the transactions, the accounts, a total number of accounts, a total number of transactions, or any combination thereof, may be caused to be displayed.

If some or all of the transactions do not already exist, then those transactions that do not already exist may be added as new transactions, then the transactions, the accounts, a total number of accounts, a total number of transactions, or any combination thereof, may be caused to be displayed.

If some or all of the accounts do not already exist, then those accounts that do not already exist may be added as new accounts, then the process may proceed to extracting transactions from the file and continue as discussed above.

If a template pattern that supports the file is not found, then the file may be sent to the new template development team so that a new template may be developed to support the file, the file type, the file format, or any combination thereof. Further, a message may be caused to be output to the user indicating that the file is not supported. The message may further include an indication that the user will be notified when the file is supported. A determination may be made as to whether there is an attempt to add another file. If there is an attempt to add another file, then the process may proceed to determining whether the file is of a supported format. If the file is of a supported format, then the process may proceed as discussed above. If the file is not of a supported format, then a message may be caused to be output to the user indicating that the file is of an invalid format. A determination may be made as to whether there is an attempt to add another file. If there is an attempt to add another file, then the process may proceed to receiving the user-selected file, determining if the new file is of a supported format, and so on, as discussed above. Otherwise, if there is no attempt to add another file, then the process may end, or the process may continually monitor to determine whether there is an attempt to add another file.

If a stored password is incorrect (e.g., it is expired or was previously entered incorrectly), then the user may be prompted to enter a password for the file. Similarly, if the password is not stored, then the user may be prompted to enter a password for the file. The process may proceed by checking if any password entered by the user is correct, and the process may continue to prompt the user for a password if the password is again incorrect. Once a correct password is received, the process may proceed to extracting data from the file and attempting to find a supported template for the file as discussed above.

If the file is not password protected, then the process may proceed to extracting data from the file and attempting to find a supported template for the file as discussed above.

Example Process(es)—Processing A Receipt

In certain implementations, processes for receiving/processing a receipt may include making a determination as to whether a mobile device is being used. If a mobile device is being used, then a window (or other indication) may be provided indicating that the user can take a picture or select a picture from a library (i.e., a data store). A determination may be made as to whether the user opts to select a picture from a library. If the user opts to select a picture from a library, then the process may proceed to receiving a selection of the picture.

A determination may also be made as to whether the user opts to add another picture (e.g., to add another part of the same receipt or to add a different receipt). If the user opts to add another picture, then a determination may be made as to whether the user opts to select a picture from a library. If the user opts to select a picture from a library, then the process may proceed as discussed above.

If the user opts not to add another picture, then any receipts digitally represented via received pictures may be processed (e.g., transaction data may be extracted and imported). Alternatively or additionally, received pictures may be processed on an ongoing basis (i.e., as they are received).

If the user opts not to select a picture from a library, then the user may take a picture using a camera of the mobile device. Upon the user having taken a picture using a camera of the mobile device, the process may proceed to determining whether the picture is acceptable, which may include determining whether the picture satisfies certain conditions regarding quality and format of the picture. If the picture is determined to be acceptable, then a determination may be made as to whether the user opts to add another picture. The process may then continue as discussed above. Otherwise, if the picture is not determined to be acceptable, then the user may opt to take another picture. A determination may be made as to acceptability of each picture taken, selected, received, or any combination thereof.

In some embodiments, if a device without a camera is being used, then the user may only be provided with the option to select a file from a data store. That is, the user may not be provided the option to take a picture with the device being used if it does not support such functionality.

In certain implementations, processes for importing transactions may include receiving a digital representation of a receipt (e.g., a photo/picture/image of a receipt). A determination may be made as to whether the receipt is computer readable. If the receipt is computer readable, then the receipt may be processed with an optical character recognition (OCR) engine. The process may then proceed to creating/adding transactions from the data extracted/processed by the OCR engine. These transactions may be displayed or otherwise provided to a quality assurance (QA) team or system. A determination may be made as to whether the receipt is QA readable. If the receipt is QA readable, then the process may proceed to setting, with respect to the transactions, description, date, amount, vendor, category, or any combination thereof. In some embodiments, further transaction details may be set. A determination may be made as to whether the transactions, individually or in combination, include valid data. If a transaction includes valid data, then the transaction is saved in a data store, and an indication of the transaction may be caused to be displayed to the user. If the transaction does not include valid data, then the process may proceed to setting, with respect to the transactions, description, date, amount, vendor, category, or any combination thereof. The process may then continue as discussed above.

If the receipt is not QA readable, then a notification may be caused to be provided to the user indicating that there was a problem processing the receipt image. In certain instances, if the receipt is not computer readable, then an empty transaction that includes default data may be created and displayed or otherwise provided to QA.

Example Process(es)—Receiving Transactions from a Bank

In certain implementations, processes for importing transactions may include receiving, from a bank or other financial institution, a file (e.g., PDF, XML, etc.) that includes bank/financial statement information. For example, the bank may send the file via email to the user at an email address associated with the transaction management module(s). In some embodiments, the email may be transmitted via simple mail transfer protocol (SMTP). Upon receiving the email, a determination may be made as to whether the email address corresponds with a valid user. If the email address corresponds with a valid user, then the file is saved in a user directory (i.e., a data store). A task may be scheduled to run at certain intervals (e.g., every five minutes). For example, the task may determine whether there are any files in the user directory that have yet to be processed. The task may further initiate extraction/importation of transaction data from any files not yet processed using one or more techniques discussed herein.

If, on the other hand, the email address does not correspond with a valid user, then the file may be deleted, designated not to be processed, or both.

Example Process(es)—Managing Distance Transactions

In certain implementations, processes for managing distance transactions (e.g., mileage) may include determining whether a mobile device is being used. If a mobile device is being used, and if the mobile device provides global positioning system (GPS) functionality (or any other feature or system suitable for tracking distance), then a determination may be made as to whether to set the GPS to record distance. If the GPS is set to record distance, then a determination may be made as to whether the GPS is on or otherwise activated. If the GPS is on, then a determination may be made as to whether the GPS has synced. Otherwise, the user may be presented with a message indicating that the GPS is off or otherwise deactivated. If the GPS is on and has synced, then the user may be provided an indication that the GPS is ready for use. If the GPS has not synced, then the GPS may be queried for signal until, for example, it is determined that the GPS has synced.

The user may also be prompted to provide an input indicating when the GPS is to start tracking distance. Once such "start" input is received from the user, the GPS may track distance until another input is received from the user indicating when the GPS is to stop tracking distance. While the GPS is tracking distance, the user may be presented with a map. If the user attempts to change the screen, the user may be presented with a warning regarding the in-process distance tracking. Once such "stop" input is received from the user, the data may be fetched from the GPS, including, for example, the tracked distance transaction data. The process may proceed to determining a price per unit distance (e.g., price per mile). For example, a determination may be made as to whether the price per unit distance is defined by a company such as the user's employer. If the price per unit distance is defined by a company, then the company-defined price per unit distance may be used. In some embodiments, if the price per unit distance is not defined by a company, then a government-defined price per unit distance may be used.

The user may be allowed to input a description in association with the fetched GPS data. The user may also be allowed to add other data in association with the fetched GPS data. For example, the user may be allowed to tag a location, tag a category, tag a business paybook, tag a personal paybook, post a comment, add a note, split a transaction, change a date, change a currency, attach a photo, tag a connection, or any combination thereof. Splitting a transaction may include changing an item amount (e.g., changing a distance value or a monetary value), tagging an item to a category, tagging an item to a business paybook, tagging an item to a personal paybook, tagging an item to a contact from the user's connections, or any combination thereof. Tagging an item to a category may include the item being automatically categorized in accordance with pre-defined rules. That is, the user may define rules for categorizing transaction data items, or the transaction management module(s) may be provided with default categorization rules, or both. In some instances, tagging an item to a contact may include choosing a contact, associating the contact with an amount/value, associating at least one of the item or the contact with a paybook, or any combination thereof. Data that is added by the user may be saved in a data store.

If a mobile device is not being used, or if a mobile device is being used but GPS functionality is not being used, then a determination may be made as to whether the distance data is already known. If the distance is already known, then the distance may be added as distance transaction data. With the price per unit distance known and the distance known, a price value may be calculated and added as transaction data. If the distance is not known, on the other hand, then the distance may be calculated via the differential between an initial point and a final point. An initial point and a final point may be received from the user and a distance may be calculated between the initial point and the final point. In some instances, calculating a distance between the initial point and the final point may include using a map feature or service that is capable of providing distances between two points via established routes (e.g., one or more roads).

Example Process(es)—Managing Time Transactions

In certain implementations, processes for managing time transactions may include determining whether time is manually input. If time is manually input, then the user may be prompted to add time. The user may also be prompted to add a description and a price per hour. A determination may be made as to whether any more data is added. The user may be allowed to add other data in association with the time data similar to the manner discussed above with respect to managing distance transactions. Data that is added by the user may be saved in a data store.

If time is not manually input, a determination may be made as to whether to start a stopwatch. If a stopwatch should be started, then the process may proceed to setting an initial time on the stopwatch. The initial time on the stopwatch may be stored. The stopwatch panel may be displayed such that the user may later perform a "stop action." Once the user stops the stopwatch, a determination may be made as to whether the time lapse is correct. If the time lapse is correct, then the user may be prompted for a description. The process may then continue as described above.

If the time lapse is not correct, then the user may be prompted to determine if the stopwatch should have been stopped earlier and adjust the time accordingly. The user may then be prompted for a description. The process may then continue as described above.

If a stopwatch should not be started, a determination may be made as to whether time is manually input. The process may then continue as described above.

Example Process(es)—Splitting/Apportioning Transactions

In certain implementations, processes for splitting transactions may include a determination as to whether the transaction is to be split by connection. If the transaction is to be split by connection, then a determination may be made as to whether the transaction is already split. If the transaction is already split, then the user may be presented with a list of connections on the transaction. A determination may be made as to whether the split amount is to be changed. If the split amount is to be changed, then the user may be prompted to add the amount. A determination may then be made as to whether the sum of the connections' amount is less than or equal to the total. If the sum of the connections' amount is less than or equal to the total, then the user may be presented with a list of connections on the transactions.

If the split amount should not be changed, then the user may be presented with a list of connections on the transactions.

Once presented with a list of connections on the transactions, the user may be prompted to add a new connection. A determination may then be made as to whether the sum of the connections' amount is less than or equal to the total. The process may then continue as discussed above.

If the sum of the connections' amount is less than or equal to the total, then the user may be presented with an error message. The user may be prompted to add a new connection. The process may then continue as discussed above.

If the transaction is not already split, then the user may be prompted to add a new connection. The process may then continue as discussed above.

If the transaction should not be split by connection, then a determination may be made as to whether the transaction is already itemized. If the transaction is already itemized, then the user may be presented with a list of items. The user may be prompted to add a new item. A determination may be made as to whether the sum of the item amounts is less than the total. If the sum of the item amounts is less than the total, the process may proceed to creating a new subtransaction equal to the item requested and modifying the last item's amount to be the remaining quantity. A determination may be made as to whether an item should be renamed, the item amount should be changed, the item category should be tagged, the item should be tagged to a personal paybook, the item should be tagged to a business paybook, a connection should be tagged, or any combination thereof. If a connection should be tagged, then a determination may be made as to whether the parent transaction is already split by connection. If the parent transaction is already split by connection, then an error message may be displayed and the user may be presented with a list of items.

If the parent transaction is not is not already split by connection, then the user may be prompted to choose a connection. The user may be prompted to add a description and/or add an amount. The process may then proceed to creating a collect transaction with the amount defined. A determination may be made as to whether to tag another connection. If another connection should be tagged, then the user may be prompted to choose a connection and the process may continue as discussed above. If another connection should not be tagged, then the user may be presented with a list of items.

If after adding a new item the sum of the item amounts is not less than the total, then a determination may be made as to whether the total amount is the same as the parent. If the total amount is not the same as the parent, then the user may be presented with a list of items. The process may then continue as discussed above. If the total amount is the same as the parent, then the process may proceed to creating a new subtransaction equal to the item requested, modifying the last item's amount to zero, and disabling the last item. A determination may be made as to whether: an item should be renamed, the item amount should be changed, the item category should be tagged, the item should be tagged to a personal paybook, the item should be tagged to a business paybook, a connection should be tagged, or any combination thereof. The process may then continue as discussed above.

If the transaction is not already itemized, then the user may be prompted to add a new item. A determination may then be made as to whether the amount is less than the total. If the amount is less than the total, then the process may continue to modifying the transaction to be a virtual container (parent transaction). A new subtransaction (child) may be created equal to the item requested, and a second subtransaction may be created with the remaining amount, inheriting all attributes from the parent. A determination may be made as to whether: an item should be renamed, the item amount should be changed, the item category should be tagged, the item should be tagged to a personal paybook, the item should be tagged to a business paybook, a connection should be tagged, or any combination thereof. The process may then continue as discussed above.

After adding a new item, if the amount is not less than the total, an error message may be displayed.

In certain embodiments, methods disclosed herein include, receiving, under control of one or more processors, information associated with a financial transaction. For example, the receiving information associated with the financial transaction may include receiving bank statement information. Additionally or alternatively, the receiving information associated with the financial transaction may include receiving purchase receipt information.

The methods may include determining, based on the information associated with the financial transaction, that the financial transaction is associated with a first theme and a second theme.

At least a portion of the information associated with the financial transaction may be designated to a first repository. The first repository may be configured to provide an aggregation of information associated with a plurality of financial transactions that are individually determined to be associated with the first theme. At least a portion of the information associated with the financial transaction may be designated to the first repository automatically. For example, at least a portion of the information associated with the financial transaction may be designated to the first repository automatically based at least in part on one or more predetermined rules. Additionally or alternatively, at least a portion of the information associated with the financial transaction may be designated to the first repository manually.

At least a portion of the information associated with the financial transaction may be designated to a second repository. The second repository may be configured to provide an aggregation of information associated with a plurality of financial transactions that are individually determined to be associated with the second theme. At least a portion of the information associated with the financial transaction may be designated to the second repository automatically. For example, at least a portion of the information associated with the financial transaction may be designated to the second repository automatically based at least in part on one or more predetermined rules. Additionally or alternatively, at least a portion of the information associated with the financial transaction may be designated to the second repository manually.

In some instances, at least a portion of the information associated with the financial transaction may be designated to the first repository automatically and at least a portion of the information associated with the financial transaction may be designated to the second repository manually, or vice-versa.

In response to a request related to the financial transaction, an indication that the financial transaction is associated with the first theme and the second theme may be provided.

In some implementations, the methods may include determining, based on the information associated with the financial transaction, that the financial transaction is associated with a financial account, and, in response to a request related to the financial transaction, providing at least an indication that the financial transaction is associated with the first repository, the second repository, and the financial account. The financial account may be a bank account. Additionally or alternatively, the financial account may be a cash account.

The methods may include, in response to receiving a request from an entity to share the first repository with one or more other entities, allowing the one or more other entities access to at least a portion of the information associated with the first repository.

In certain embodiments, methods disclosed herein include identifying, based on the information associated with the financial transaction, at least one monetary value. The methods may include determining whether the at least one monetary value is associated with an expenditure by a plurality of entities. In response to determining that the at least one monetary value is associated with an expenditure by a plurality of entities, the at least one monetary value may be apportioned such that individual ones of the plurality of entities are associated with an apportioned monetary value.

The methods may include determining, based at least in part on at least one apportioned monetary value, that a first entity owes an owed monetary value to a second entity. An indication may be provided to at least one of the first entity or the second entity that the first entity owes the owed monetary value to the second entity.

At least a portion of the owed monetary value may be transferred to the second entity. For example, the first entity may transfer at least a portion of the owed monetary value to the second entity. Additionally or alternatively, a third entity benefactor of the first entity may transfer at least a portion of the owed monetary value to the second entity. In response to a transfer of at least a portion of the owed monetary value to the second entity, the owed monetary value may be updated to an updated owed monetary value. For example, the updated monetary value may be a difference between the owed monetary value and the at least a portion of the owed monetary value transferred to the second entity. An indication may be provided to at least one of the first entity or the second entity that the first entity owes the updated monetary value to the second entity.

In some embodiments, the first repository may be configured to provide an aggregation of information associated with a plurality of personal financial transactions that are individually determined to be associated with the first theme. The second repository may be configured to provide an aggregation of information associated with a plurality of business financial transactions that are individually determined to be associated with the second theme.

At least one of the first repository or the second repository may be shared between an individual user account and a business entity account such that information designated to the respective at least one of the first repository or the second repository by a user of the individual user account is provided to the business entity account. For example, the business entity account may be associated with a business entity and the individual user account may be associated with an employee of the business entity.

In certain implementations, the present disclosure includes one or more computer-readable media having computer-readable instructions therein that, when executed by one or more processors, cause the one or more processors to perform acts. The acts may include receiving data associated with at least one financial transaction.

For example, receiving the data associated with the at least one financial transaction may include receiving an input of one or more electronic files associated with at least one bank statement, and extracting data from the one or more electronic files associated with the at least one bank statement. As another example, receiving the data associated with the at least one financial transaction may include receiving an input of one or more electronic files associated with at least one purchase receipt, and extracting data from the one or more electronic files associated with the at least one bank statement. In some embodiments, for individual electronic files of the one or more electronic files, a determination may be made as to whether the individual electronic file matches one or more predefined templates. In response to determining that the individual electronic file matches one or more predefined templates, data may be extracted from the individual electronic file in accordance with a matching predefined template.

At least a subset of the data may be associated with at least one thematic repository of a plurality of thematic repositories. An individual thematic repository of the plurality of thematic repositories may, for example, be configured to aggregate data from a plurality of financial transactions that are individually determined to be associated with a theme of the individual thematic repository. A user interface may be generated. The user interface may provide at least an indication that the at least a subset of the data is associated with the at least one thematic repository of the plurality of thematic repositories.

In some embodiments, associating the at least a subset of the data with the at least one thematic repository of the plurality of thematic repositories may include automatically categorizing, based at least in part on a comparison of the extracted data to one or more predefined categorization rules, at least a subset of the extracted data into at least a first thematic repository of the plurality of thematic repositories. In certain instances, associating the at least a subset of the data with the at least one thematic repository of the plurality of thematic repositories may include receiving a manual categorization of the at least a subset of the extracted data into at least a second thematic repository of the plurality of thematic repositories.

At least one thematic repository of the plurality of thematic repositories may be published such that at least a subset of data aggregated by the at least one thematic repository is accessible to multiple entities via one or more user accounts, the one or more user accounts being configured to provide thematic repository functionality.

Certain implementations disclosed herein include systems having one or more processors, memory, and a thematic repository module maintained in the memory and executed on the one or more processors to perform acts. The acts may include receiving information associated with a transaction. Based on the information associated with the transaction, it may be determined that the transaction is associated with at least one thematic repository of a plurality of thematic repositories. An individual thematic repository of the plurality of thematic repositories may, for example, be configured to aggregate information from a plurality of financial transactions that are individually determined to be associated with a theme of the individual thematic repository. In response to a request related to the transaction, at least an indication that the transaction is associated with the at least one thematic repository of the plurality of thematic repositories may be provided.

In some embodiments, the at least one thematic repository of the plurality of thematic repositories may include a first thematic repository configured to aggregate information from a plurality of financial transactions that are individually determined to be associated with a same bank account. Additionally or alternatively, the at least one thematic repository of the plurality of thematic repositories may include a second thematic repository configured to aggregate information from a plurality of transactions that are individually determined to be associated with a same user-defined theme.

The systems may further include a user interface module maintained in the memory and executed on the one or more processors to perform acts. The acts may include receiving a request related to the at least one thematic repository of the plurality of thematic repositories, and, in response to receiving the request related to the at least one thematic repository of the plurality of thematic repositories, causing to be displayed an aggregation of information from a plurality of transactions that are individually determined to be associated with the at least one thematic repository of the plurality of thematic repositories. Additionally or alternatively, the acts may include generating a user interface that allows a user to view, manipulate, or both view and manipulate, at least a portion of the aggregation of information at varying levels of granularity.

In some embodiments, allowing a user to manipulate the at least a portion of the aggregation of information includes allowing a first user to associate a monetary value with a second user. The second user may be an employer of the first user, and the monetary value may be designated a business expense such that the employer is capable of generating an expense report based at least in part on the monetary value.

In some embodiments, allowing a user to manipulate the at least a portion of the aggregation of information includes allowing a first user to split a monetary value such that at least a portion of the monetary value is associated with a second user.

In some embodiments, allowing a user to manipulate the at least a portion of the aggregation of information includes allowing the user to add electronic documents that are determined to be associated with the aggregation of information.

In certain embodiments, the at least one thematic repository of the plurality of thematic repositories may include: a first thematic repository configured to aggregate information from a plurality of financial transactions that are individually determined to be associated with a same bank account, a second thematic repository configured to aggregate information from a plurality of transactions that are individually determined to be associated with a same system-defined theme, and a third thematic repository configured to aggregate information from a plurality of transactions that are individually determined to be associated with a same user-defined theme.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
under control of one or more processors,
receiving information associated with a financial transaction;
determining, based on the information associated with the financial transaction, that the financial transaction is associated with a first theme and a second theme;
designating a first portion of the information associated with the financial transaction to a first repository, the first repository configured to provide an aggregation of information associated with a plurality of personal financial transactions that are individually determined to be associated with the first theme;
designating a second portion of the information associated with the financial transaction to a second repository, wherein the second repository is configured to provide an aggregation of information associated with a plurality of business financial transactions that are individually determined to be associated with the second theme, and wherein at least some of the second portion of the information is unique to the second repository; and
in response to a request related to the financial transaction, providing at least an indication that the financial transaction is associated with the first theme and the second theme.

2. The method of claim 1, further comprising:
determining, based on the information associated with the financial transaction, that the financial transaction is associated with a financial account; and
in response to a request related to the financial transaction, providing at least an indication that the financial transaction is associated with the first repository, the second repository, and the financial account.

3. The method of claim 2, wherein the financial account is a bank account.

4. The method of claim 2, wherein the financial account is a cash account.

5. The method of claim 1, wherein at least one of the first portion of the information is designated to the first repository automatically or the second portion of the information is designated to the second repository automatically.

6. The method of claim 1, wherein at least one of:
the first portion of the information designated to the first repository automatically, and the second portion of the information designated to the second repository manually; or
the second portion of the information is designated to the second repository automatically, and the first portion of the information is designated to the first repository manually.

7. The method of claim 1, wherein the first portion of the information that is designated to the first repository is designated automatically based at least in part on one or more predetermined rules.

8. The method of claim 1, wherein receiving the information associated with the financial transaction comprises receiving bank statement information.

9. The method of claim 1, wherein receiving the information associated with the financial transaction comprises:
receiving an image of a purchase receipt; and
extracting information associated with a purchase from data associated with the image.

10. The method of claim 1, further comprising, in response to receiving a request from an entity to share at least one of the first repository or the second repository with one or more other entities, allowing the one or more other entities access to at least some of the information associated with the at least one of the first repository or the second repository.

11. The method of claim 1, further comprising:
identifying, based on the information associated with the financial transaction, at least one monetary value;
determining whether the at least one monetary value is associated with an expenditure by a plurality of entities;
in response to determining that the at least one monetary value is associated with an expenditure by a plurality of entities, apportioning the at least one monetary value such that individual ones of the plurality of entities are associated with an apportioned share of the monetary value of a plurality of apportioned shares of the monetary value;
determining, based at least in part on a first apportioned share of the monetary value corresponding to a first entity, that a first entity owes an owed monetary value to a second entity; and
providing an indication, to at least one of the first entity or the second entity, that the first entity owes the owed monetary value to the second entity.

12. The method of claim 11, further comprising:
in response to a transfer by the first entity of at least a portion of the owed monetary value to the second entity, updating the owed monetary value to an updated monetary value, wherein the updated monetary value is a difference between the owed monetary value and the at least a portion of the owed monetary value transferred to the second entity;
providing an indication, to at least one of the first entity or the second entity, that the first entity owes the updated monetary value to the second entity.

13. The method of claim 1, wherein the second repository is shared between an individual user account and a business entity account such that information designated to the second repository by a user of the individual user account is provided to the business entity account.

14. The method of claim 13, wherein the business entity account is associated with a business entity and the individual user account is associated with an employee of the business entity.

15. One or more computer-readable media having computer-readable instructions therein that, when executed by one or more processors, cause the one or more processors to perform acts comprising:
receiving information associated with a financial transaction;
determining, based on the information associated with the financial transaction, that the financial transaction is associated with a first theme and a second theme;

designating a first portion of the information associated with the financial transaction to a first repository, the first repository configured to provide an aggregation of information associated with a plurality of financial transactions that are individually determined to be associated with the first theme;

designating a second portion of the information associated with the financial transaction to a second repository, wherein the second repository is configured to provide an aggregation of information associated with a plurality of financial transactions that are individually determined to be associated with the second theme, and wherein at least some of the second portion of the information is unique to the second repository;

in response to a request related to the financial transaction, providing at least an indication that the financial transaction is associated with the first theme and the second theme; and in response to receiving a request from an entity to share at least one of the first repository or the second repository with one or more other entities, allowing the one or more other entities access to at least some of the information associated with at least one of the first repository or the second repository.

16. The one or more computer-readable media of claim 15,
wherein the information associated with the financial transaction includes distance information, and wherein the distance information comprises a number of miles traveled by a device associated with a user, wherein the device is associated with at least one of the first repository or the second repository; and
wherein the number of miles is based at least in part on GPS data received from the device associated with the user.

17. The one or more computer-readable media of claim 15, wherein the acts further comprise:
designating the first portion of the information associated with the financial transaction to the first repository automatically; and
designating the second portion of the information associated with the financial transaction to the second repository manually.

18. A system comprising:
one or more processors;
memory; and
a thematic repository module maintained in the memory and executed on the one or more processors to:
receive information associated with a financial transaction;
determine, based on the information associated with the financial transaction, that the financial transaction is associated with a first theme and a second theme;
designate a first portion of the information associated with the financial transaction to a first repository, the first repository configured to provide an aggregation of information associated with a plurality of financial transactions that are individually determined to be associated with the first theme;
designate a second portion of the information associated with the financial transaction to a second repository, wherein the second repository is configured to provide an aggregation of information associated with a plurality of financial transactions that are individually determined to be associated with the second theme, and wherein at least some of the second portion of the information is unique to the second repository; and
in response to receiving a request from an entity to share at least one of the first repository or the second repository with one or more other entities, allowing the one or more other entities access to at least some of the information associated with at least one of the first repository or the second repository.

19. The system of claim 18, wherein the first portion of the information associated with the financial transaction is designated to the first repository automatically.

20. The system of claim 18, wherein the thematic repository is further executed on the one or more processors to, in response to a request related to the financial transaction, provide at least an indication that the financial transaction is associated with the first theme and the second theme.

* * * * *